(12) United States Patent
Tanaka et al.

(10) Patent No.: US 11,490,386 B2
(45) Date of Patent: Nov. 1, 2022

(54) COMMUNICATION APPARATUS AND METHOD FOR CONTROLLING COMMUNICATION APPARATUS

(71) Applicant: SONY SEMICONDUCTOR SOLUTIONS CORPORATION, Kanagawa (JP)

(72) Inventors: Katsuyuki Tanaka, Kanagawa (JP); Yusuke Shinohe, Tokyo (JP); Fumitaka Kondo, Kanagawa (JP); Tatsuki Amimoto, Tokyo (JP); Shingo Harada, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 53 days.

(21) Appl. No.: 15/761,503

(22) PCT Filed: Aug. 16, 2016

(86) PCT No.: PCT/JP2016/073939
§ 371 (c)(1),
(2) Date: Mar. 20, 2018

(87) PCT Pub. No.: WO2017/061175
PCT Pub. Date: Apr. 13, 2017

(65) Prior Publication Data
US 2018/0270823 A1    Sep. 20, 2018

(30) Foreign Application Priority Data

Oct. 5, 2015 (JP) .............................. JP2015-197337

(51) Int. Cl.
*H04W 72/04* (2009.01)
*H04B 1/401* (2015.01)
(Continued)

(52) U.S. Cl.
CPC .......... *H04W 72/0453* (2013.01); *G01K 7/22* (2013.01); *H04B 1/401* (2013.01); *H04B 13/00* (2013.01);
(Continued)

(58) Field of Classification Search
CPC ........... H04W 72/0453; H04W 72/044; H04W 72/04; H04W 56/0005; H04W 56/00;
(Continued)

(56) References Cited

U.S. PATENT DOCUMENTS 4,291,409 A * 9/1981 Weinberg ............... H04B 7/216
375/347
5,777,524 A * 7/1998 Wojewoda ............. H03B 5/368
331/116 R
(Continued)

FOREIGN PATENT DOCUMENTS

CN    1904773 A    1/2007
CN    101124735 A    2/2008
(Continued)

OTHER PUBLICATIONS

International Search Report and Written Opinion of PCT Application No. PCT/JP2016/073939, dated Aug. 16, 2016, 07 pages of ISRWO.

Primary Examiner — Jeffrey M Rutkowski
Assistant Examiner — Luna Weissberger
(74) Attorney, Agent, or Firm — Chip Law Group

(57) ABSTRACT

A communication apparatus performs communication while suppressing an increase in power consumption. The communication apparatus includes a periodic signal generating unit, a clocking unit, a multiplication unit, and a communication processing unit. The periodic signal generating unit generates a predetermined periodic signal. The clocking unit clocks time in synchronization with the predetermined peri-
(Continued)

odic signal generated by a frequency signal generating unit. The multiplication unit multiplies the predetermined periodic signal generated by the frequency signal generating unit to supply the signal as a multiplied signal. The communication processing unit performs predetermined communication processing in synchronization with the multiplied signal generated by the multiplication unit.

13 Claims, 31 Drawing Sheets

(51) Int. Cl.
    *H04B 13/00*     (2006.01)
    *G01K 7/22*     (2006.01)
    *H04W 56/00*     (2009.01)

(52) U.S. Cl.
    CPC ....... *H04B 13/005* (2013.01); *H04W 56/0005* (2013.01)

(58) Field of Classification Search
    CPC . G01K 7/22; H04B 1/401; H04B 1/40; H04B 1/38; H04B 13/00
    USPC .......................................................... 370/329
    See application file for complete search history.

(56) References Cited

U.S. PATENT DOCUMENTS

| | | | | |
|---|---|---|---|---|
| 2003/0219082 A1* | 11/2003 | Tanaka | ................... | H03J 1/005 375/324 |
| 2005/0153751 A1 | 7/2005 | Aykut et al. | | |
| 2007/0026832 A1* | 2/2007 | Someya | ................. | G04R 20/10 455/263 |
| 2008/0197982 A1* | 8/2008 | Sadr | .................. | H03M 13/6331 340/10.4 |
| 2009/0225743 A1* | 9/2009 | Nicholls | ............... | H04J 3/0688 370/350 |
| 2011/0075581 A1* | 3/2011 | Mihota | ................. | H04B 7/0682 370/252 |
| 2014/0148637 A1* | 5/2014 | Gratt | ........................ | A61N 1/08 600/9 |
| 2014/0355063 A1* | 12/2014 | Jang | ....................... | G06F 3/1205 358/1.15 |
| 2015/0065107 A1* | 3/2015 | Dave | ................. | H04M 1/72572 455/418 |
| 2015/0244548 A1* | 8/2015 | Weissman | .......... | H04B 17/0082 455/42 |
| 2015/0295622 A1* | 10/2015 | Kim | ..................... | H04B 5/0025 455/41.1 |
| 2015/0304971 A1* | 10/2015 | Shor | ....................... | H04L 7/033 370/350 |

FOREIGN PATENT DOCUMENTS

| | | |
|---|---|---|
| EP | 1748332 A2 | 1/2007 |
| JP | 2007-060614 A | 3/2007 |
| JP | 2007-528642 A | 10/2007 |
| JP | 2012-060583 A | 3/2012 |
| JP | 2012-60583 A | 3/2012 |
| JP | 5105688 B2 | 12/2012 |
| KR | 10-2006-0130617 A | 12/2006 |
| KR | 10-2007-0014071 A | 1/2007 |
| WO | 2005/062855 A2 | 7/2005 |

\* cited by examiner

FIG. 12

| FREQUENCY DIVISION CHANNEL | FREQUENCY fc (MHz) | 1T (=1/fc) | P-PDU LENGTH (=66T) | TIME SEGMENT LENGTH (=64T×8) | LISTENING PERIOD (=576T) |
|---|---|---|---|---|---|
| 4 | 40.68 | 24.58ns | 1.622us | 12.58us | 14.16us |
| 3 | 13.56 | 73.75ns | 4.867us | 37.75us | 42.47us |
| 2 | 8.136 | 122.9ns | 8.112us | 62.92us | 70.79us |
| 1 | 5.811 | 172.1ns | 11.36us | 88.09us | 99.11us |
| 0 | 3.698 | 270.4ns | 17.85us | 138.4us | 155.7us |

*FIG. 13*

| | | | ISO/IEC 14443 Type A | ISO/IEC 14443 Type B | FeliCa (ISO/IEC 18092 PASSIVE COMMUNICATION MODE) |
|---|---|---|---|---|---|
| COLLISION PREVENTION METHOD | ANTI-COLLISION | | BIT COLLISION, TIME SLOT | SLOT MARKER | TIME SLOT |
| COMMUNICATION METHOD | BIT CODING | (READER/WRITER)→(CARD) | Modified Miller | NRZ | Manchester |
| | | (CARD)→(READER/WRITER) | Manchester | NRZ | Manchester |
| | MODULATION METHOD | (READER/WRITER)→(CARD) | ASK 100% | ASK 10% | ASK 10% |
| | | (CARD)→(READER/WRITER) | OOK | BPSK | ASK |
| | CARRIER | | $fc=13.56MHz$ SUBCARRIER $fc/16=847kHz$ | | $fc=13.56MHz$ NO SUBCARRIER |
| | COMMUNICATION SPEED | | 106kbps ($fc/128$) OR MORE | | 212kbps ($fc/64$) OR MORE |
| | COMMUNICATION TYPE | | NON-TARGET TYPE SUBCARRIER IS USED FOR (CARD)→(READER/WRITER) | | TARGET TYPE |
| TYPICAL APPLICATIONS | | | taspo | BASIC RESIDENT REGISTER CARD DRIVER'S LICENSE | Suica, PASMO, Edy |

FIG. 14

| NFC FORUM STANDARD | POLLING/ LISTENING CODING | CODING | MODULATION METHOD | DATA RATE | CARRIER FREQUENCY |
|---|---|---|---|---|---|
| NFC-A | POLLING | MODIFIED MILLER | ASK 100% | 106kb/s | 13.56MHz |
| NFC-A | LISTENING | MANCHESTER | LOAD MODULATION (ASK) | 106kb/s | 13.56MHz±848kHz SUBCARRIER |
| NFC-B | POLLING | NRZ-L | ASK 10% | 106kb/s | 13.56MHz |
| NFC-B | LISTENING | NRZ-L | LOAD MODULATION (BPSK) | 106kb/s | 13.56MHz±848kHz SUBCARRIER |
| NFC-F | POLLING | MANCHESTER | ASK 10% | 212/424kb/s | 13.56MHz |
| NFC-F | LISTENING | MANCHESTER | LOAD MODULATION (ASK) | 212/424kb/s | 13.56MHz (NO SUBCARRIER) |

| FDC | S/N RATIO DEGRADATION IN CLK$_{RTC}$ SELECTION | SELECTION SIGNAL | ENABLE SIGNAL | FREQUENCY DIVISION RATIO |
|---|---|---|---|---|
| 4 (FREQUENCY HIGH) | GREATER THAN 3dB | 1 (CLK$_{OSC}$ IS SELECTED) | 1 (OSCILLATOR IS TURNED ON) | DIV$_{OSC}$ |
| 3 (FREQUENCY LOW) | LESS THAN 0.1dB | 0 (CLK$_{RTC}$ IS SELECTED) | 0 (OSCILLATOR IS TURNED OFF) | DIV$_{RTC}$ |
| 2 (FREQUENCY LOW) | | | | |
| 1 (FREQUENCY LOW) | | | | |
| 0 (FREQUENCY LOW) | | | | |

| TEMPERATURE T | SELECTION SIGNAL | ENABLE SIGNAL | FREQUENCY DIVISION RATIO |
|---|---|---|---|
| UPPER LIMIT VALUE < T < LOWER LIMIT VALUE | 0 (CLK$_{RTC}$ IS SELECTED) | 0 (OSCILLATOR IS TURNED OFF) | DIV$_{RTC}$ |
| T ≥ UPPER LIMIT VALUE OR T ≤ LOWER LIMIT VALUE | 1 (CLK$_{OSC}$ IS SELECTED) | 1 (OSCILLATOR IS TURNED ON) | DIV$_{OSC}$ |

COMMUNICATION APPARATUS AND METHOD FOR CONTROLLING COMMUNICATION APPARATUS

CROSS REFERENCE TO RELATED APPLICATIONS

This application is a U.S. National Phase of International Patent Application No. PCT/JP2016/073939 filed on Aug. 16, 2016, which claims priority benefit of Japanese Patent Application No. JP 2015-197337 filed in the Japan Patent Office on Oct. 5, 2015. Each of the above-referenced applications is hereby incorporated herein by reference in its entirety.

TECHNICAL FIELD

The present technology relates to a communication apparatus and a method for controlling the communication apparatus. More particularly, the present technology relates to a communication apparatus including a real-time clock and a method for controlling the communication apparatus.

BACKGROUND ART

In recent years, along with the evolution of technologies related to sensors, wireless communication, and cloud computing, development of Internet of Things (IoT) devices using these technologies has been advanced. Many of these IoT devices are required to be small in size and low in cost. For this reason, the IoT device is equipped with a low-capacity battery as a power supply, and various circuits and parts are commonly used from the viewpoint of reducing power consumption.

In addition, in the IoT device, a wireless signal is processed in synchronization with a clock signal from a crystal oscillator whose oscillation frequency is on the order of megahertz. As the oscillation frequency of the crystal oscillator, an integer multiple of 13 megahertz (MHz) or 19.2 megahertz (MHz) common in mobile phones, 20 megahertz (MHz) in Wi-Fi (registered trademark), and the like are used.

For example, a communication apparatus has been devised in which a clock signal from a crystal oscillator is multiplied by a phase-locked loop, and a wireless signal is transmitted and received with the multiplied clock signal (see, for example, Patent Document 1). The communication apparatus reduces power consumption by stopping each circuit except a real-time clock in a sleep mode.

CITATION LIST

Patent Document

Patent Document 1: Japanese Patent No. 5105688

SUMMARY OF THE INVENTION

Problems to be Solved by the Invention

In the conventional technology described above, since the crystal oscillator and the phase-locked loop are stopped in the sleep mode, the communication apparatus cannot perform communication using clock signals from these circuits. In addition to the real-time clock, if the crystal oscillator and the like are operated even in the sleep mode, communication can be performed; however, power consumption is increased by an amount for the operated circuit or element. For this reason, it is difficult to perform communication while suppressing an increase in power consumption.

The present technology has been developed in view of such a situation, and aims that a communication apparatus performs communication while suppressing an increase in power consumption.

Solutions to Problems

The present technology has been made to solve problems described above, and a first aspect of the present technology is a communication apparatus including: a periodic signal generating unit that generates a predetermined periodic signal; a clocking unit that clocks time in synchronization with the predetermined periodic signal; a multiplication unit that multiplies the predetermined periodic signal to supply the signal as a multiplied signal; and a communication processing unit that performs predetermined communication processing in synchronization with the multiplied signal, and a method for controlling the communication apparatus. As a result, the time is clocked in synchronization with the periodic signal, and the communication processing is executed in synchronization with the multiplied signal obtained by multiplying the periodic signal.

In addition, in the first aspect, the communication apparatus may further include: a high frequency signal generating unit that generates a high frequency signal having a higher frequency than the predetermined periodic signal; and a selection unit that selects either the high frequency signal or the predetermined periodic signal to supply a selected signal to the multiplication unit. As a result, any of the high frequency signal and the predetermined periodic signal is multiplied.

In addition, in the first aspect, the communication apparatus may be configured such that the predetermined communication processing includes processing of transmitting and receiving a signal superimposed on a carrier, a setting unit is further included, the setting unit setting any of a plurality of frequencies as a frequency of the carrier in the communication processing unit, and the selection unit selects the predetermined periodic signal in a case where the frequency of the carrier does not exceed a predetermined frequency, and selects the high frequency signal in a case where the frequency of the carrier is higher than the predetermined frequency. As a result, in the case where the frequency of the carrier is higher than the predetermined frequency, the high frequency signal is selected.

In addition, in the first aspect, the communication apparatus may be configured such that the predetermined communication processing includes processing of transmitting and receiving a baseband signal, a setting unit is further included, the setting unit setting any of a plurality of frequencies as a frequency of the baseband signal in the communication processing unit, and the selection unit selects the predetermined periodic signal in a case where the frequency of the baseband signal does not exceed a predetermined frequency, and selects the high frequency signal in a case where the frequency of the baseband signal is higher than the predetermined frequency. As a result, in the case where the frequency of the baseband signal is higher than the predetermined frequency, the high frequency signal is selected.

In addition, in the first aspect, the communication apparatus may further include a temperature measurement unit that measures temperature, in which the selection unit selects the predetermined periodic signal in a case where the temperature measured is a temperature within a predetermined range, and selects the high frequency signal in a case where the temperature measured is a temperature outside the predetermined range. As a result, in the case where the measured temperature is the temperature outside the predetermined range, the high frequency signal is selected.

In addition, in the first aspect, the communication apparatus may be configured such that the temperature measurement unit includes: a thermistor whose resistance varies with a change of the temperature, and a measurement unit that measures the temperature on the basis of a voltage corresponding to the resistance. As a result, the temperature is measured from the voltage corresponding to the resistance of the thermistor.

In addition, in the first aspect, the communication apparatus may be configured such that the temperature measurement unit includes: a proportional to absolute temperature voltage circuit that generates a voltage proportional to the temperature; and a measurement unit that measures the temperature on the basis of the voltage. As a result, the temperature is measured from the voltage of the proportional to absolute temperature voltage circuit.

In addition, in the first aspect, the communication apparatus may be configured such that the predetermined communication processing includes processing of transmitting and receiving a signal superimposed on a carrier, and a frequency of the carrier does not exceed 13.56 megahertz. As a result, the signal superimposed on the carrier having the frequency of 13.56 MHz or less is transmitted and received.

In addition, in the first aspect, the communication apparatus may be configured such that the predetermined communication processing includes processing of transmitting and receiving a baseband signal, and a frequency of the baseband signal does not exceed 13.56 megahertz. As a result, the baseband signal having a frequency of 13.56 MHz or less is transmitted and received.

In addition, in the first aspect, the communication apparatus may be configured such that the predetermined communication processing includes processing of transmitting and receiving a packet having a packet length not exceeding 4.867 microseconds. As a result, the packet having the packet length of 4.867 microseconds or less is transmitted and received.

In addition, in the first aspect, the communication apparatus may be configured such that the predetermined communication processing includes processing of transmitting and receiving data at a data rate not exceeding 424 kilobits per second. As a result, the data is transmitted and received at a data rate of 424 kilobits per second or less.

In addition, in the first aspect, the communication apparatus may be configured such that the predetermined communication processing includes processing of modulating or demodulating a symbol having a symbol length not shorter than 2.36 microseconds. As a result, the symbol having the symbol length of 2.36 microseconds or more is modulated or demodulated.

In addition, in the first aspect, the communication apparatus may be configured such that the predetermined communication processing includes processing of transmitting and receiving a signal superimposed on a carrier, and the multiplication unit multiplies the periodic signal by a multiplication ratio higher than a value obtained by dividing a frequency of the carrier by a frequency of the predetermined periodic signal. As a result, the periodic signal is multiplied by the multiplication ratio higher than the value obtained by dividing the frequency of the carrier by the frequency of the periodic signal.

In addition, in the first aspect, the communication apparatus may be configured such that the predetermined communication processing includes processing of transmitting and receiving a baseband signal, and the multiplication unit multiplies the periodic signal by a multiplication ratio higher than a value obtained by dividing a frequency of the baseband signal by a frequency of the predetermined periodic signal. As a result, the periodic signal is multiplied by the multiplication ratio higher than the value obtained by dividing the frequency of the baseband signal by the frequency of the periodic signal.

In addition, in the first aspect, the communication apparatus may be configured such that the communication processing unit performs the communication processing in accordance with a communication standard in non-contact communication. As a result, non-contact communication is performed.

In addition, in the first aspect, the communication apparatus may be configured such that the communication processing unit performs the communication processing in accordance with a communication standard in human body communication. As a result, human body communication is performed.

Effects of the Invention

According to the present technology, it is possible to achieve an excellent effect that the communication apparatus can perform communication while suppressing an increase in power consumption. Incidentally, the effect described here is not necessarily limited, and can be any effect described in the present disclosure.

BRIEF DESCRIPTION OF DRAWINGS

FIG. 12 is a diagram illustrating an example of a specification for each frequency division channel in the first embodiment of the present technology.

FIG. 13 is a diagram illustrating an example of a specification for each communication standard in the first embodiment of the present technology.

FIG. 14 is a diagram illustrating an example of a specification of the NFC Forum standard in the first embodiment of the present technology.

MODE FOR CARRYING OUT THE INVENTION

The following is a description of a mode for carrying out the present technology (the mode will be hereinafter referred to as the embodiment). The description will be made in the following order.

1. First embodiment (example of multiplying clock signal from real-time clock)
2. Second embodiment (example of performing human body communication by multiplying clock signal from real-time clock)
3. Third embodiment (example of multiplying clock signal from real-time clock or crystal oscillator)
4. Fourth embodiment (example of multiplying clock signal from real-time clock in host unit)
5. Fifth embodiment (example of measuring temperature and multiplying clock signal from real-time clock or crystal oscillator)

1. First Embodiment

Configuration Example of Communication Apparatus

Figure 1:
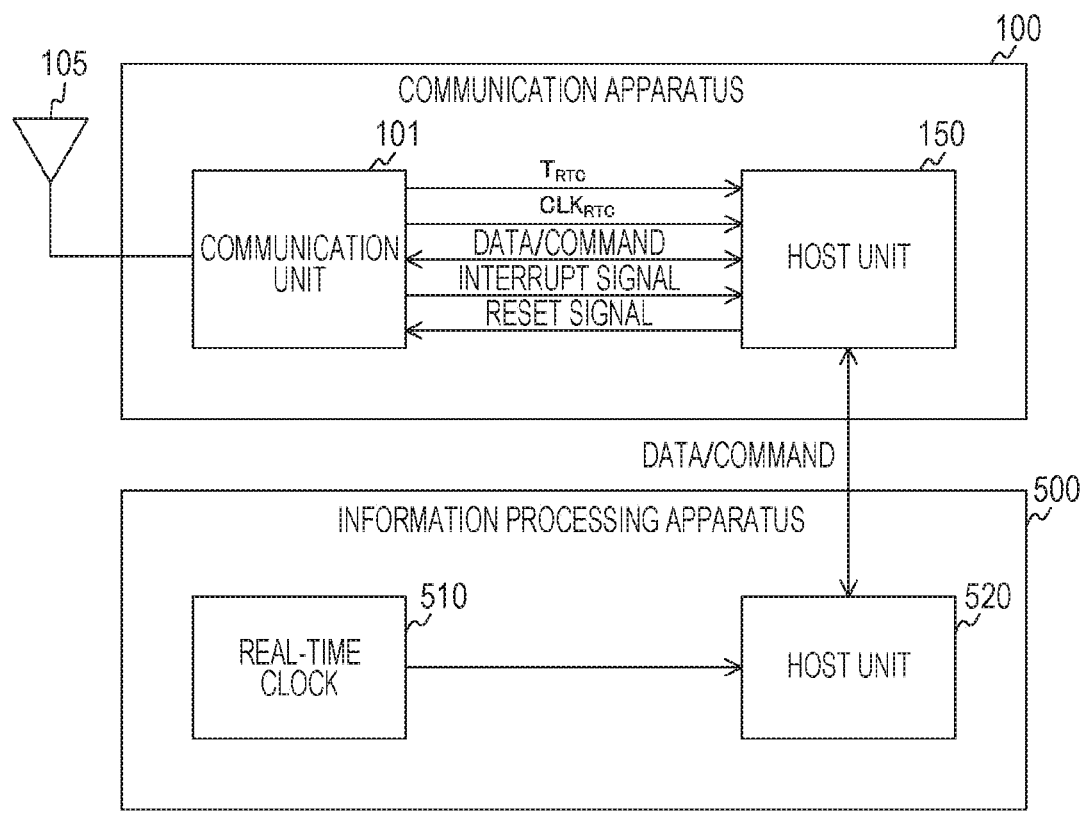
FIG. 1 is a block diagram illustrating a configuration example of an information processing system in a first embodiment of the present technology.

FIG. 1 is a block diagram illustrating a configuration example of an information processing system in a first embodiment. The information processing system includes a communication apparatus 100 and an information processing apparatus 500. The communication apparatus 100 includes a communication unit 101 and a host unit 150, and the information processing apparatus 500 includes a real-time clock 510 and a host unit 520. In addition, an antenna 105 is attached to the communication apparatus 100. As the communication apparatus 100, a device is assumed that performs non-contact communication with another device, for example, an IoT device, a non-contact integrated circuit (IC) card, a reader/writer, or the like. As the information processing apparatus 500, a personal computer or the like is assumed, for example.

The antenna 105 receives a radio wave and converts the radio wave into an electric signal, and converts an electric signal into an electric wave and transmits the electric wave. The antenna 105 supplies a converted electric signal to the communication unit 101 as a received signal. In addition, when an electric signal is supplied as a transmission signal from the communication unit 101, the antenna 105 converts the transmission signal into a radio wave.

The communication unit 101 performs predetermined communication processing in accordance with control of the host unit 150. The communication unit 101 generates time information $T_{RTC}$, a clock signal $CLK_{RTC}$, an interrupt signal, and received data, and supplies them to the host unit 150. In addition, the communication unit 101 receives and processes a command, transmission data, and a reset signal from the host unit 150. Here, the time information $T_{RTC}$ is information indicating time clocked in synchronization with the clock signal $CLK_{RTC}$. The clock signal $CLK_{RTC}$ is a clock signal generated by the real-time clock in the communication unit 101. The interrupt signal is a signal for returning the host unit 150 from the sleep mode. The reset signal is a signal for initializing various settings of the communication unit 101.

The host unit 150 generates and supplies the transmission data to the communication unit 101, and processes the received data from the communication unit. In addition, the host unit 150 uses the time information $T_{RTC}$ to execute various applications, and controls the communication unit 101 by a command. In addition, the host unit 150 transmits and receives the command and data to and from the information processing apparatus 500.

In addition, the host unit 150 determines whether or not to shift from a normal mode to a sleep mode on the basis of operation by a user, or the like. For example, it is determined that the operation should be shifted to the sleep mode in a case where the user performs operation for shifting to the sleep mode, or in a case where a period during which the operation is not performed exceeds a certain time.

Here, the normal mode is a state in which power is supplied to all circuits in the communication apparatus 100. On the other hand, the sleep mode is a state in which the power to some of the circuits in the communication apparatus 100 is cut off, and the power is supplied to the rest of the circuits. In the sleep mode, for example, the power to the host unit 150 is cut off, and the power is supplied to the rest of the circuits, such as the communication unit 101.

The real-time clock 510 clocks current time. The real-time clock 110 operates independently of the real-time clock in the communication unit 101, and supplies time information indicating the current time to the host unit 520. The host unit 520 controls the communication apparatus 100. The host unit 520 transmits and receives the data and command to and from the host unit 150.

Figure 2:
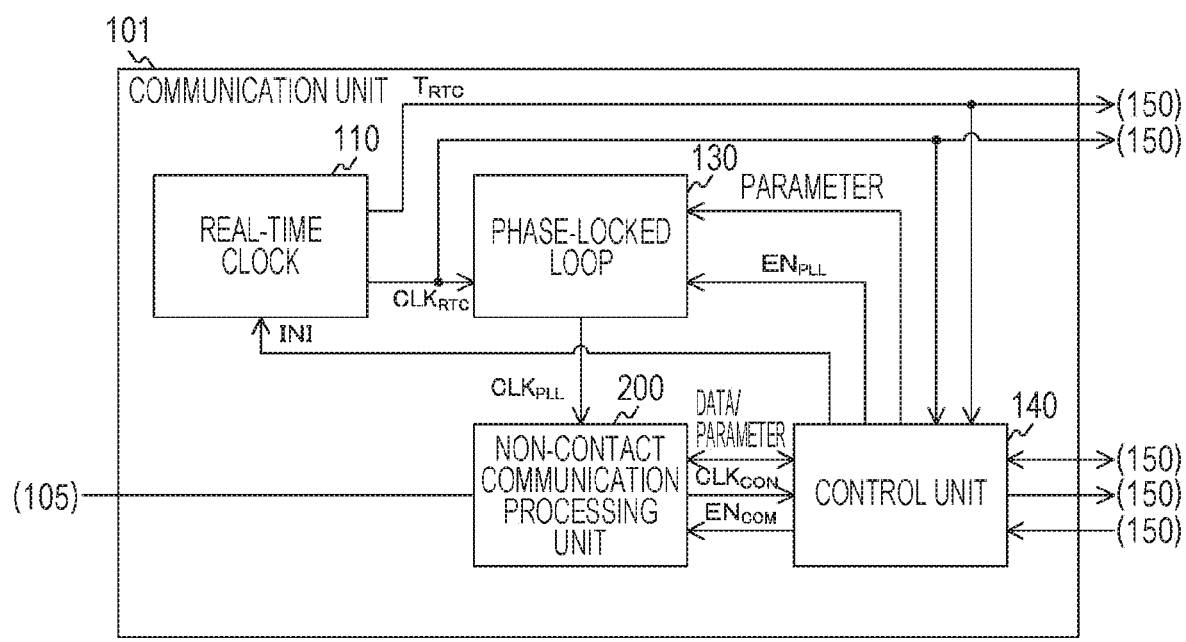
FIG. 2 is a block diagram illustrating a configuration example of a communication unit in the first embodiment of the present technology.

FIG. 2 is a block diagram illustrating a configuration example of the communication unit 101 in the first embodiment. The communication unit 101 includes a real-time clock 110, a phase-locked loop 130, a control unit 140, a non-contact communication processing unit 200, and a host unit 150.

The real-time clock 110 clocks current time. The real-time clock 110 generates the clock signal $CLK_{RTC}$ of a predetermined frequency and clocks the current time in synchronization with the clock signal $CLK_{RTC}$. The frequency of the clock signal $CLK_{RTC}$ is much lower than a carrier frequency used in communication processing of the non-contact communication processing unit 200, and is on the order of kilohertz (kHz) units, for example. Specifically, the frequency of the clock signal $CLK_{RTC}$ is set to 32.768 kilohertz (kHz) or the like. In addition, the real-time clock 110 supplies the generated clock signal $CLK_{RTC}$ to the phase-locked loop 130, the control unit 140, and the host unit 150, and supplies the time information $T_{RTC}$ indicating the current time to the control unit 140 and the host unit 150. In addition, the real-time clock 110 initializes the current time in accordance with an initialization signal INI from the control unit 140.

The phase-locked loop 130 receives and multiplies the clock signal $CLK_{RTC}$ as a reference clock. The phase-locked loop 130 supplies a signal obtained by multiplying the clock signal $CLK_{RTC}$ to the non-contact communication processing unit 200 as a clock signal $CLK_{PLL}$. In addition, parameters such as a frequency division ratio of the phase-locked loop 130 are set by the control unit 140. In addition, the phase-locked loop 110 starts or ends multiplication operation in accordance with an enable signal $EN_{PLL}$ from the control unit 140. Incidentally, the phase-locked loop 130 is an example of a multiplication unit described in the claims.

The control unit 140 controls each circuit in the communication unit 101. For example, the control unit 140 divides a time period into time slots and allocates transmission or reception for each time slot. Then, the control unit 140 causes the non-contact communication processing unit 200 to execute modulation processing in a transmission time slot, and causes the non-contact communication processing unit 200 to execute demodulation processing in a reception time slot. Here, the control unit 140 supplies data acquired by the demodulation processing to the host unit 150, and the control unit 140 supplies data from the host unit 150 to the communication unit 101 to cause the communication unit 101 to perform the modulation processing. In addition, the control unit 140 initializes the real-time clock 110 with the initialization signal INI as necessary. In addition, the control unit 140 stops the phase-locked loop 130 and the non-contact communication processing unit 200 with enable signals $EN_{PLL}$ and $EN_{COM}$ as necessary. For example, when the communication apparatus 100 shifts to the sleep mode, the control unit 140 stops the phase-locked loop 130 and the non-contact communication processing unit 200. Then, in the sleep mode, the control unit 140 intermittently operates the phase-locked loop 130 and the non-contact communication processing unit 200 on a predetermined schedule on the basis of the clock signal $CLK_{RTC}$ and the time information $T_{RTC}$.

The non-contact communication processing unit 200 performs predetermined communication processing in synchronization with the clock signal $CLK_{PLL}$ under control of the control unit 140. The non-contact communication processing unit 200 performs at least one of the modulation processing and the demodulation processing, for example, as the communication processing. In addition, these modulation processing and demodulation processing are performed in accordance with a communication standard in the non-contact communication. As the communication standard, International Organization for Standardization (ISO)/International Electrotechnical Commission (IEC) 17982, or European Computer Manufacturers Association (ECMA)-401 is used. Alternatively, ISO/IEC 14443, FeliCa (registered trademark), or the like is used. Parameters such as a channel in these communication standards are set by the control unit 140.

In addition, the non-contact communication processing unit 200 frequency-divides the clock signal $CLK_{PLL}$ to generate a clock signal $CLK_{CON}$, and supplies the clock signal $CLK_{CON}$ to the control unit 140. In addition, the non-contact communication processing unit 200 obtains received data by the demodulation processing and supplies the received data to the control unit 140, and receives transmission data from the control unit 140 and performs the modulation processing. A signal superimposed on a carrier is transmitted and received by the modulation processing and the demodulation processing. Incidentally, the non-contact communication processing unit 200 may transmit and receive a baseband signal generated with a period of the clock signal $CLK_{PLL}$ as 1-bit length. In addition, the non-contact communication processing unit 200 is an example of a communication processing unit described in the claims.

As described above, in the communication apparatus 100, both clocking and communication processing are performed with the clock signal $CLK_{RTC}$ generated by the real-time clock 110. For this reason, compared with a configuration in which a crystal oscillator is provided in addition to the real-time clock 110, the communication processing is performed by a clock signal from the crystal oscillator, and time is clocked with the clock signal $CLK_{RTC}$, power consumption can be reduced by an amount for the crystal oscillator. For example, power consumption of an oscillator oscillating at several tens of kilohertz (kHz) in the real-time clock 110 is 1 microwatt (μW) or less, and power consumption of a crystal oscillator oscillating at a frequency of 10 megahertz (MHz) or more is about 1 milliwatt (mW). For this reason, an effect is great of reducing power consumption by reducing the crystal oscillator outside the real-time clock 110. In addition, by reducing the number of crystal oscillators, the number of parts can be reduced and the cost and mounting area can be reduced.

Figure 3:
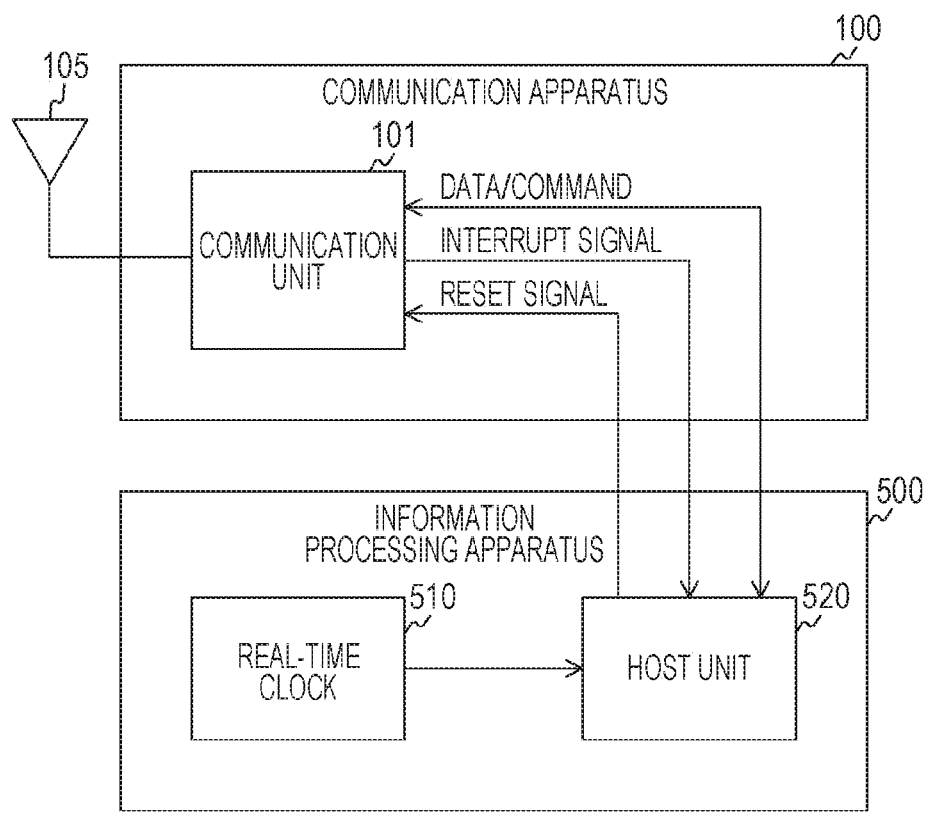
FIG. 3 is a block diagram illustrating a configuration example of an information processing system in which an arrangement of host units is changed in the first embodiment of the present technology.

Incidentally, the real-time clock 110, the phase-locked loop 130, the control unit 140, the non-contact communication processing unit 200, and the host unit 150 are arranged in the same apparatus; however, they may be arranged to be distributed in a plurality of apparatuses. For example, as illustrated in FIG. 3, the real-time clock 110, the phase-locked loop 130, the control unit 140, and the non-contact communication processing unit 200 may be provided in the communication apparatus 100, and the host unit 150 may be integrated with the host unit 520 on the information processing apparatus 500 side. In addition, the communication apparatus 100 performs both transmission and reception; however, only one of them may be performed. For example, as the communication apparatus 100 that only performs reception, a Global Navigation Satellite System (GNSS) receiver or the like is assumed.

Configuration Example of Real-Time Clock

Figure 4:
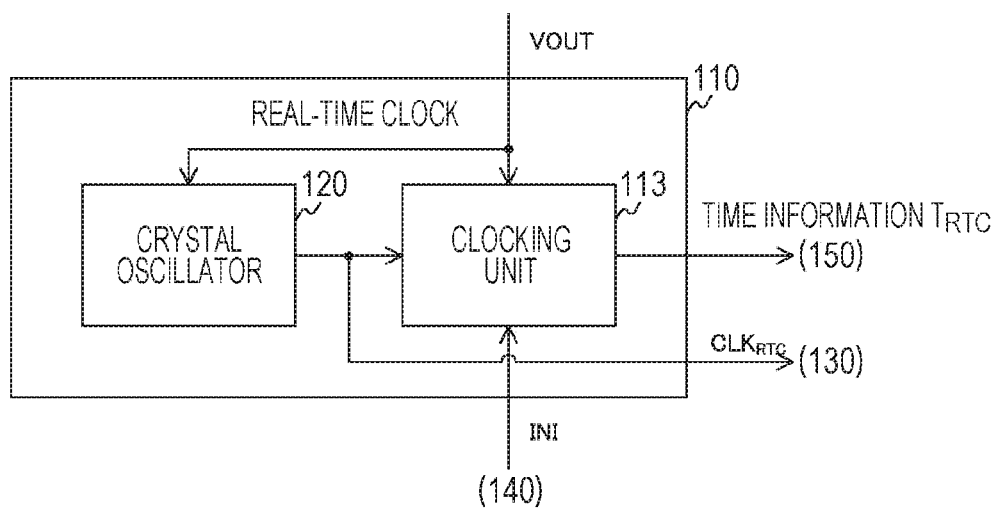
FIG. 4 is a block diagram illustrating a configuration example of a real-time clock in the first embodiment of the present technology.

FIG. 4 is a block diagram illustrating a configuration example of the real-time clock 110 in the first embodiment. The real-time clock 110 includes a crystal oscillator 120 and a clocking unit 113.

The crystal oscillator 120 uses a crystal resonator to generate the clock signal $CLK_{RTC}$ of a constant frequency (for example, 32.768 kHz). The crystal oscillator 120 supplies the generated clock signal $CLK_{RTC}$ to the clocking unit 113 and the phase-locked loop 130. Incidentally, the crystal oscillator 120 is an example of a periodic signal generating unit described in the claims.

The clocking unit 113 clocks the current time in synchronization with the clock signal $CLK_{RTC}$. The clocking unit 113 generates and supplies the time information $T_{RTC}$ indicating the current time to the host unit 150. In addition, the clocking unit 113 sets the current time to an initial value in accordance with the initialization signal INI from the control unit 140.

Figure 5:
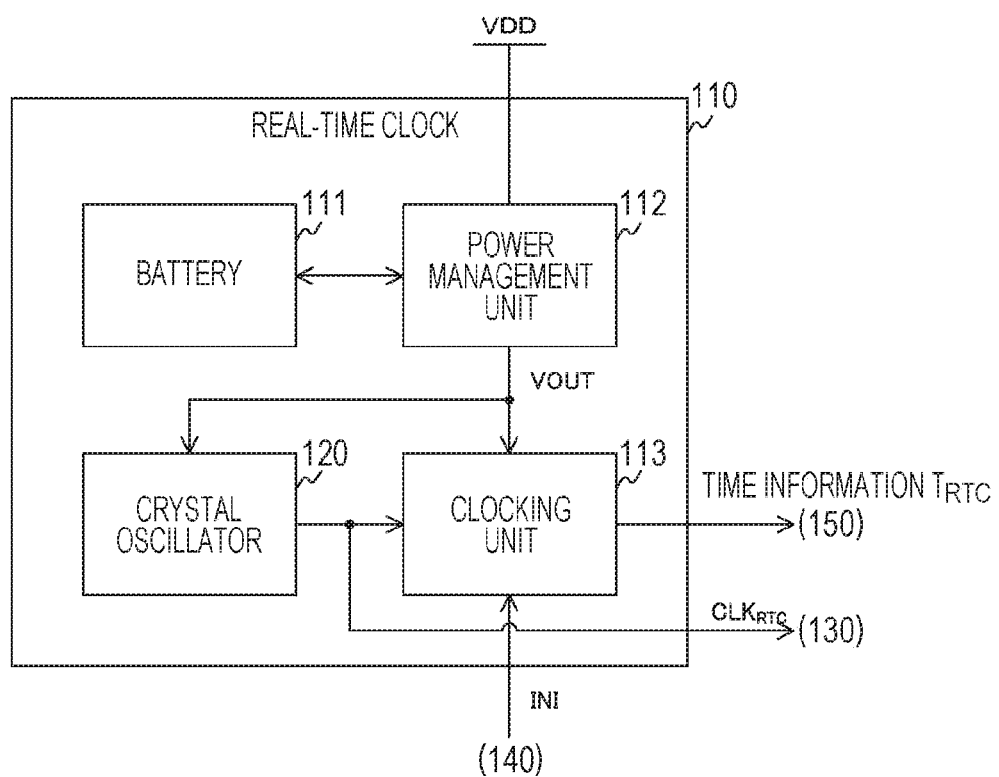
FIG. 5 is a block diagram illustrating a configuration example of the real-time clock provided with a battery and a power management unit in the first embodiment of the present technology.

Incidentally, as illustrated in FIG. 5, a battery 111 and a power management unit 112 may be further provided in the real-time clock 110. When a power supply voltage VDD is supplied to the communication apparatus 100, the power management unit 112 uses the power supply voltage VDD to charge the battery 111, and supplies an output voltage VOUT to the crystal oscillator 120 and the clocking unit 113. On the other hand, when the supply of the power supply voltage VDD is cut off, power from the battery 111 is used to supply the output voltage VOUT to the crystal oscillator 120 and the clocking unit 113.

Configuration Example of Crystal Oscillator

Figure 6:
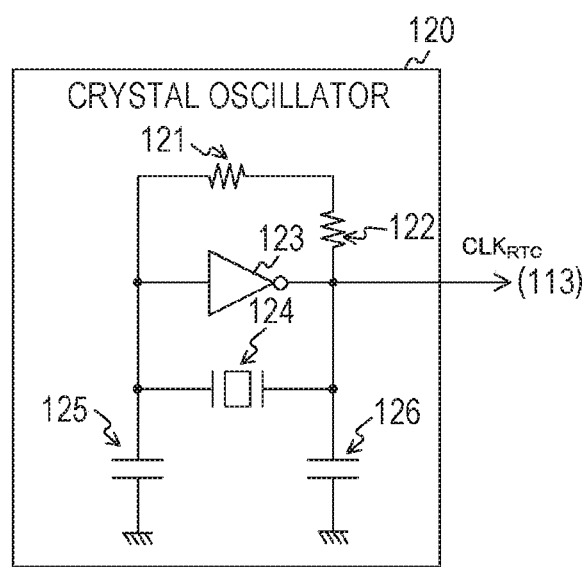
FIG. 6 is a circuit diagram illustrating a configuration example of a crystal oscillator in the first embodiment of the present technology.

FIG. 6 is a circuit diagram illustrating a configuration example of the crystal oscillator 120 in the first embodiment. The crystal oscillator 120 includes resistors 121 and 122, an inverter 123, a crystal resonator 124, and capacitors 125 and 126.

The resistors 121 and 122 are connected in series, and these resistors are connected in parallel to the inverter 123.

In addition, an input terminal of the inverter 123 is connected to the resistor 121, the crystal resonator 124, and the capacitor 125. On the other hand, an output terminal of the inverter 123 is connected to the resistor 122, the crystal resonator 124, and the capacitor 126.

One end of the capacitor 125 is connected to the resistor 121, the inverter 123, and the crystal resonator 124, and the other end is grounded. One end of the capacitor 126 is connected to the resistor 122, the inverter 123, and the crystal resonator 124, and the other end is grounded.

The crystal resonator 124 oscillates at a constant oscillation frequency due to piezoelectric effect. A circuit other than the crystal resonator 124 operates as an oscillation circuit that oscillates at a frequency corresponding to the oscillation frequency of the crystal resonator 124, and generates the clock signal $CLK_{RTC}$.

Configuration Example of Phase-Locked Loop

Figure 7:
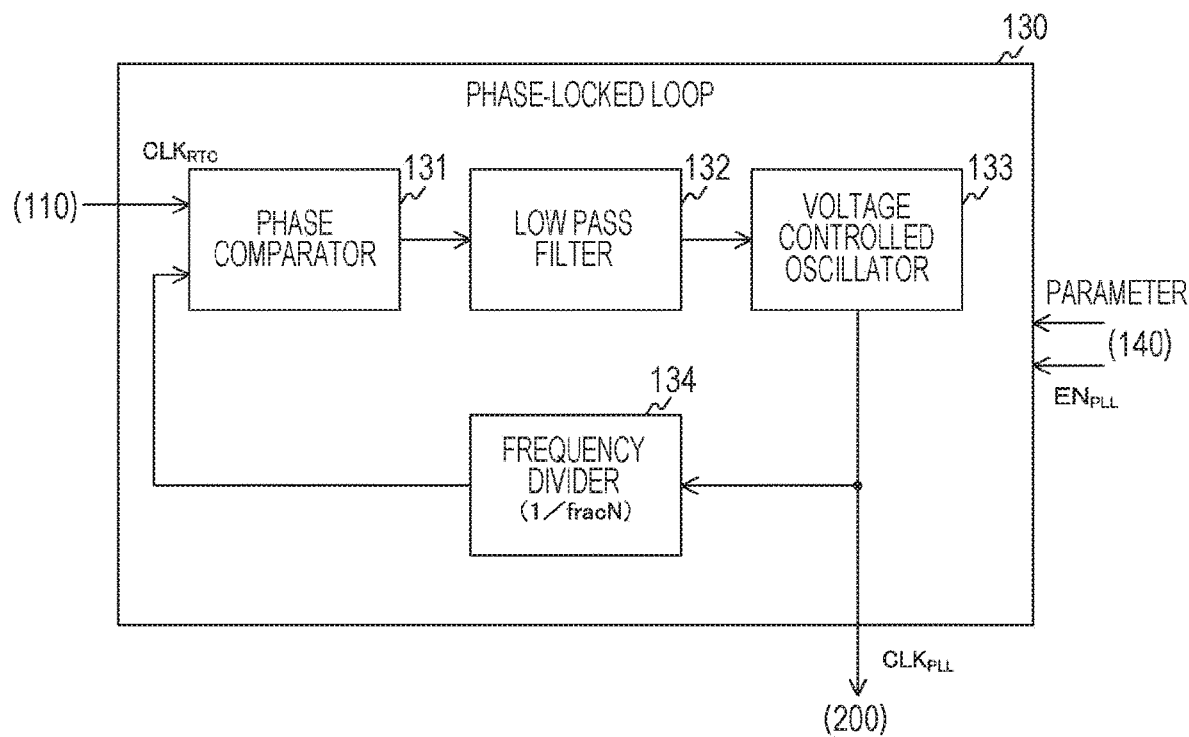
FIG. 7 is a block diagram illustrating a configuration example of a phase-locked loop in the first embodiment of the present technology.

FIG. 7 is a block diagram illustrating a configuration example of the phase-locked loop 130 in the first embodiment. The phase-locked loop 130 includes a phase comparator 131, a low pass filter 132, a voltage controlled oscillator 133, and a frequency divider 134.

The phase comparator 131 compares phases of the clock signal $CLK_{RTC}$ from the real-time clock 110 and a feedback signal from the frequency divider 134. The phase comparator 131 supplies a voltage corresponding to a phase difference between the clock signal $CLK_{RTC}$ and the feedback signal as a phase difference signal to the low pass filter 132.

The low pass filter 132 allows a band equal to or lower than the predetermined cutoff frequency to pass, in the phase difference signal, and supplies the band to the voltage controlled oscillator 133.

The voltage controlled oscillator 133 generates the clock signal $CLK_{PLL}$ having a frequency corresponding to a level of the phase difference signal passing through the low pass filter 132. The voltage controlled oscillator 133 supplies the generated clock signal $CLK_{PLL}$ to the frequency divider 134 and the non-contact communication processing unit 200.

The frequency divider 134 frequency-divides the clock signal $CLK_{PLL}$ with a predetermined frequency division ratio fracN, and supplies the signal to the phase comparator 131 as a feedback signal. Here, a non-integer value can be set for the frequency division ratio fracN. The phase-locked loop 130 capable of setting a non-integer frequency division ratio in this way is referred to as a fractional PLL. Incidentally, the phase-locked loop 130 may be an integer type PLL that can set only an integer as the frequency division ratio.

By the feedback of the frequency-divided signal, the clock $CLK_{RTC}$ on the order of kilohertz is multiplied by the same multiplication ratio as the frequency division ratio fracN. By this multiplication, for example, the clock signal $CLK_{PLL}$ on the order of megahertz (for example, an integer multiple of 13.56 MHz) is generated.

Figure 8A:
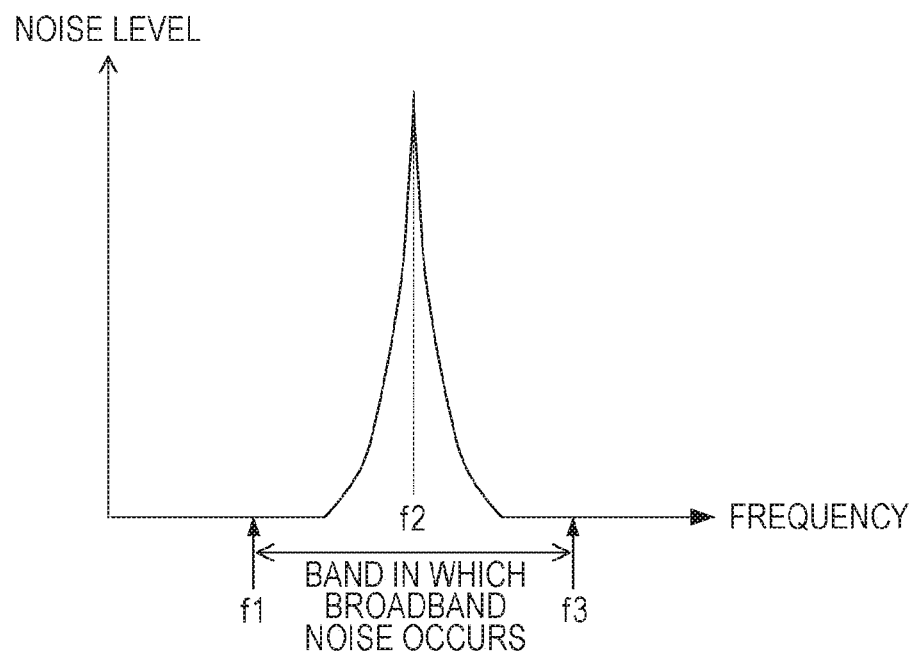
FIGS. 8*a* and 8*b* are diagrams for explaining a characteristic of jitter in the first embodiment of the present technology.
Figure 8B:
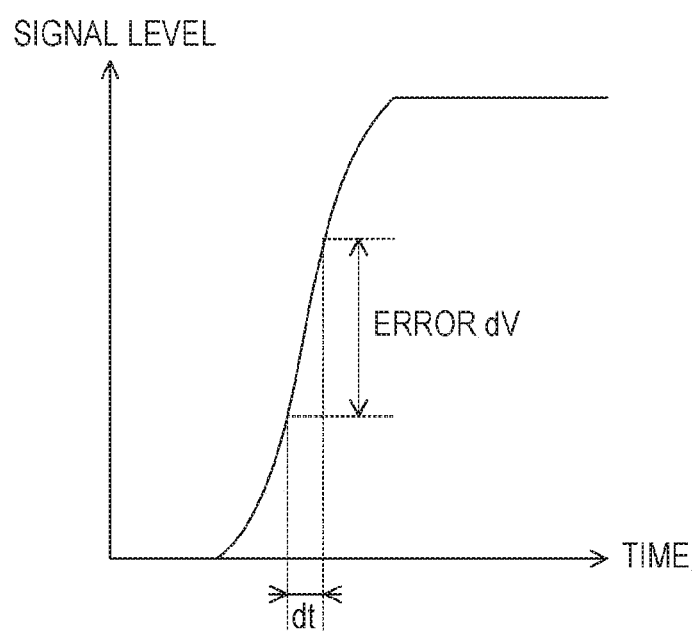

FIGS. 8a and 8b are diagrams for explaining a characteristic of jitter in the first embodiment. In the figure, the vertical axis of a represents a level of the phase noise, and the horizontal axis represents a frequency of the phase noise. As illustrated in the figure, phase noise is generated in a band from a frequency f1 to a frequency f3 including a frequency f2 of the clock signal CLKPLL.

In addition, the vertical axis of FIG. 8b illustrates a level of the clock signal CLKPLL, and the horizontal axis illustrates time. As illustrated in the figure, when phase noise of an error dV is added at the center of the amplitude of the waveform of this signal, jitter of dt occurs.

Figure 9:
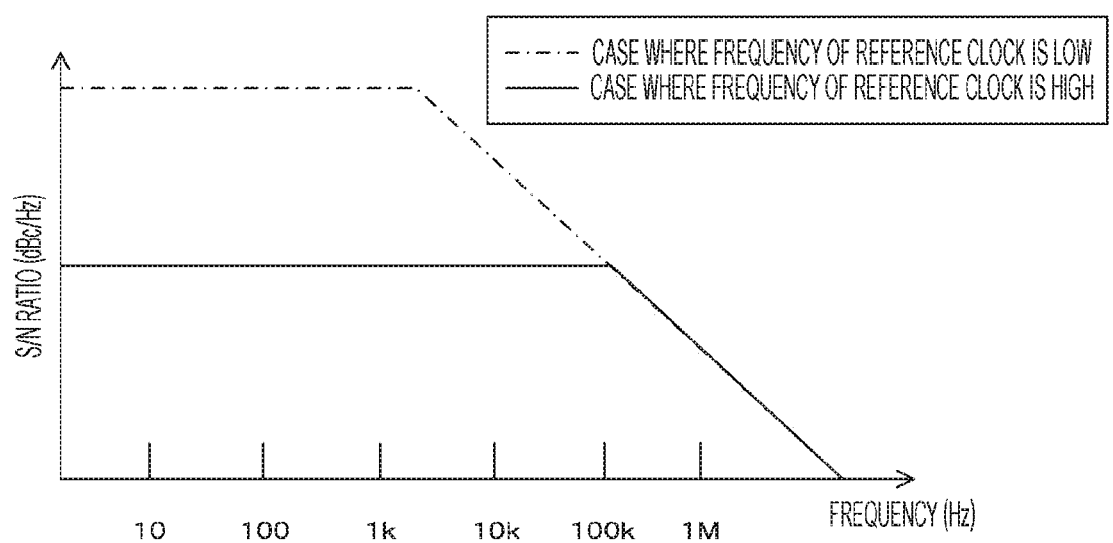
FIG. 9 is a graph illustrating an example of a relationship between phase noise and frequency for each reference clock in the first embodiment of the present technology.

FIG. 9 is a graph illustrating an example of a relationship between the phase noise and the frequency for each reference clock in the first embodiment of the present technology. In the figure, the vertical axis illustrates an S/N ratio, and the horizontal axis illustrates a frequency of the $CLK_{PLL}$. In addition, the solid line indicates a characteristic in a case where a frequency of the reference clock is high (for example, on the order of megahertz), and the dash-dot line indicates a characteristic in a case where the frequency of the reference clock is low (for example, on the order of kilohertz). As illustrated in the figure, in a band where the frequency of the $CLK_{PLL}$ is 100 kilohertz (kHz) or less, as the frequency of the reference clock is lower, the phase noise is greater.

As illustrated in FIGS. 8a, 8b, and 9, as the frequency of the reference clock (CLKRTC) input to the PLL is lower, the phase noise (jitter) of the CLKPLL output from the PLL is lower, and frequency precision is degraded. This is because in the PLL, as the frequency of the reference clock is lower, a phase comparison interval in a phase comparator is longer, and the jitter tends to occur inside the PLL.

Here, in wireless communication such as Wi-Fi (registered trademark), it is necessary to satisfy the frequency precision restriction in the Radio Act, and to increase tolerance to a disturbance wave due to spectrum broadening of the oscillation frequency. For this reason, a low frequency signal on the order of kilohertz, in which the frequency precision is degraded and the jitter tends to occur, is not used as the reference clock, and in general a high frequency signal on the order of megahertz is used as reference clock.

However, depending on the type of communication system used by the communication apparatus 100, even if the frequency of the reference clock is relatively low, problems do not always occur such as degradation of the S/N ratio. For example, in Near Field Communication (NFC) and ISO/IEC 17982, the frequency precision required is comparatively low as about ±50 ppm. On the other hand, Long Term Evolution (LTE) requires high accuracy of ±(0.05 ppm+12 Hz) or (0.10 ppm+15 Hz). For this reason, it is desirable to apply the communication apparatus 100 to non-contact communication such as NFC that requires relatively low frequency precision.

In addition, if the communication system has a relatively low carrier frequency or baseband signal frequency, the multiplication ratio can be reduced, so that the jitter hardly occurs even if the reference clock frequency is low. For example, it is desirable that the carrier frequency and the frequency of the baseband signal are 13.56 megahertz (MHz) or less.

In addition, as the packet length is shorter and the data rate is lower, influence of the jitter is smaller. For example, the packet length is desirably 4.867 microseconds (μs) or less, and the data rate is preferably 424 kilobits per second (kbps) or less. In addition, as the symbol length is longer, the influence of the jitter is less, and the symbol length is desirably 2.36 microseconds (μs) or more.

In addition, in a case where the communication apparatus 100 performs reception only like a GNSS receiver, the communication apparatus 100 is not subject to restriction of the Radio Act. For this reason, in a configuration that only performs reception, if the disturbance tolerance degradation due to the jitter or the like is acceptable, the frequency of the reference clock can be lowered even if the conditions described above are not sufficiently satisfied regarding the frequency, packet length, data rate, and symbol length.

Configuration Example of Non-Contact Communication Processing Unit

Figure 10:
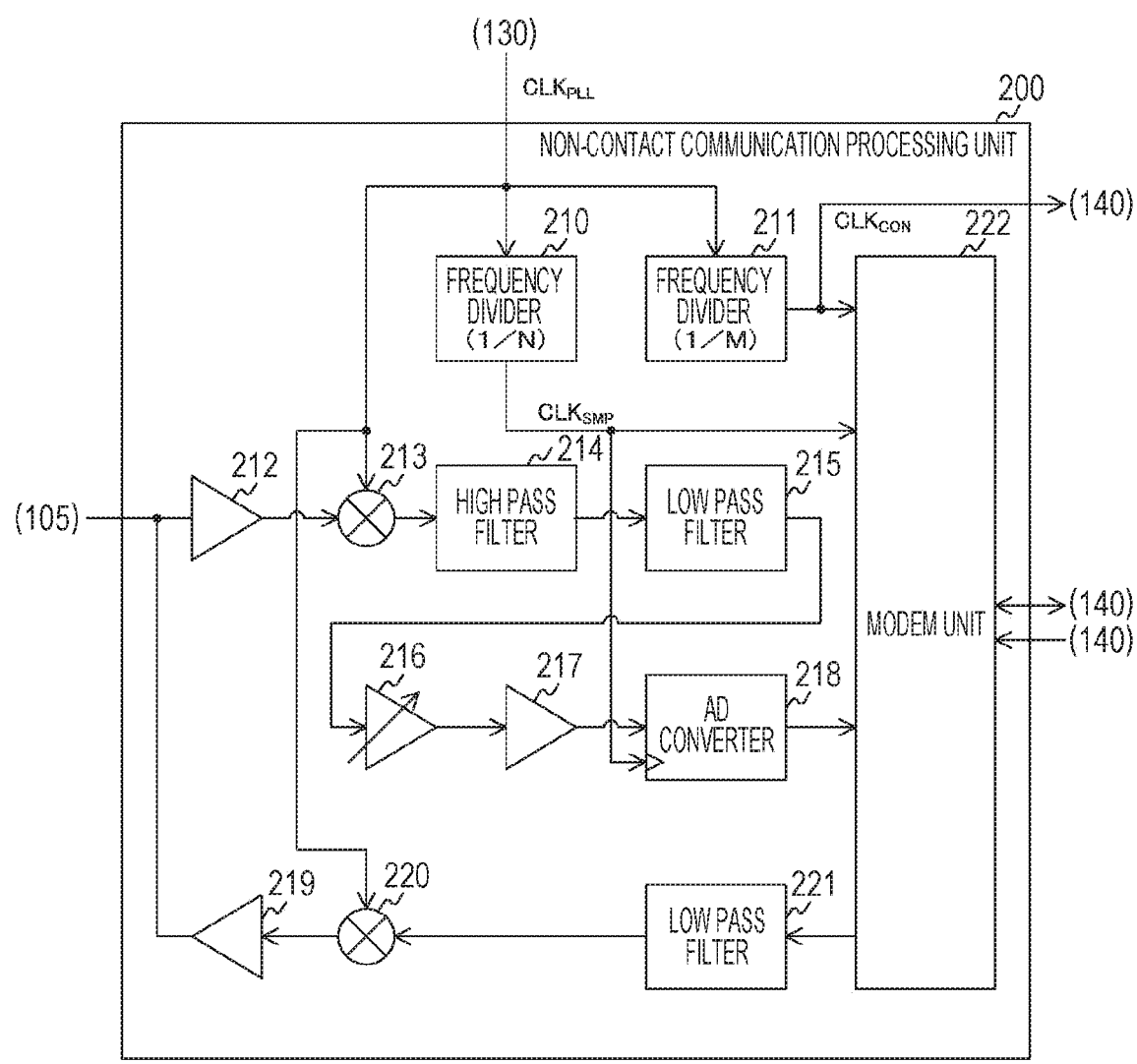
FIG. 10 is a block diagram illustrating a configuration example of a non-contact communication processing unit in the first embodiment of the present technology.

FIG. 10 is a block diagram illustrating a configuration example of the non-contact communication processing unit 200 in the first embodiment. The non-contact communication processing unit 200 includes frequency dividers 210 and 211, a low noise amplifier 212, a mixer 213, a high pass filter 214, a low pass filter 215, an automatic gain control unit 216, a buffer 217, and an AD converter 218. In addition, the non-contact communication processing unit 200 includes a modem unit 222, a low pass filter 221, a mixer 220, and a low noise amplifier 219.

The frequency divider 210 frequency-divides the clock signal $CLK_{PLL}$ from the phase-locked loop 130 by a frequency division ratio N (N is an integer). The frequency division ratio N is assumed to be smaller than the multiplication ratio of the phase-locked loop 130. The frequency divider 210 supplies the frequency-divided clock signal as a sampling clock signal $CLK_{SMP}$ to the AD converter 218 and the modem unit 222.

The frequency divider 211 frequency-divides the clock signal $CLK_{PLL}$ by a frequency division ratio M (M is an integer). This frequency division ratio M is assumed to be smaller than the multiplication ratio of the phase-locked loop 130. The frequency divider 211 supplies the frequency-divided clock signal as the clock signal $CLK_{CON}$ to the modem unit 222 and the control unit 140.

The low noise amplifier 212 amplifies the received signal from the antenna 105 with low noise and supplies the signal to the mixer 213. The mixer 213 mixes the clock signal $CLK_{PLL}$ and the received signal from the low noise amplifier 212 and supplies the mixed signal to the high pass filter 214.

The high pass filter 214 allows a band higher than a predetermined cutoff frequency to pass, in the received signal from the mixer 213. The low pass filter 215 allows a band lower than a predetermined cutoff frequency to pass, in the received signal passing through the high pass filter 214. The automatic gain control unit 216 controls a gain of the received signal passing through the low pass filter 215, and supplies the signal to the AD converter 218 via the buffer 217.

The AD converter 218 performs AD conversion on the received signal from the buffer 217 in synchronization with the sampling clock signal $CLK_{SMP}$. The AD converter 218 supplies the digital signal generated by the AD conversion to the modem unit 222.

The modem unit 222 performs modulation processing or demodulation processing. The modem unit 222 captures a digital signal from the AD converter 218 in synchronization with the sampling clock signal $CLK_{SMP}$. Then, the modem unit 222 performs demodulation processing for taking out the received data superimposed on the carrier, in the captured signal, in synchronization with the clock signal $CLK_{CON}$. The modem unit 222 supplies the acquired received data to the control unit 140.

In addition, the modem unit 222 performs the modulation processing of superimposing transmission data from the control unit 140 on the carrier in synchronization with the clock signal $CLK_{CON}$. The modem unit 222 supplies the modulated signal to the low pass filter 221 as a transmission signal.

The low pass filter 221 allows a band lower than a predetermined cutoff frequency to pass, in the transmission signal. The mixer 220 mixes the transmission signal passing through the low pass filter 221 and the clock signal $CLK_{PLL}$ and supplies the mixed signal to the low noise amplifier 219. The low noise amplifier 219 amplifies the received signal from the mixer 220 with low noise and supplies the signal to the antenna 105.

Each circuit and element in the non-contact communication processing unit 200 operates in accordance with control of the control unit 140. For example, in the reception time slot, the control unit 140 operates the low noise amplifier 212, the mixer 213, the high pass filter 214, the low pass filter 215, the automatic gain control unit 216, and the buffer 217, to cause the modem unit 222 to perform demodulation processing. On the other hand, in the transmission time slot, the control unit 140 causes the modem unit 222 to perform the modulation processing, and operates the low pass filter 221, the mixer 220, and the low noise amplifier 219.

Figure 11:
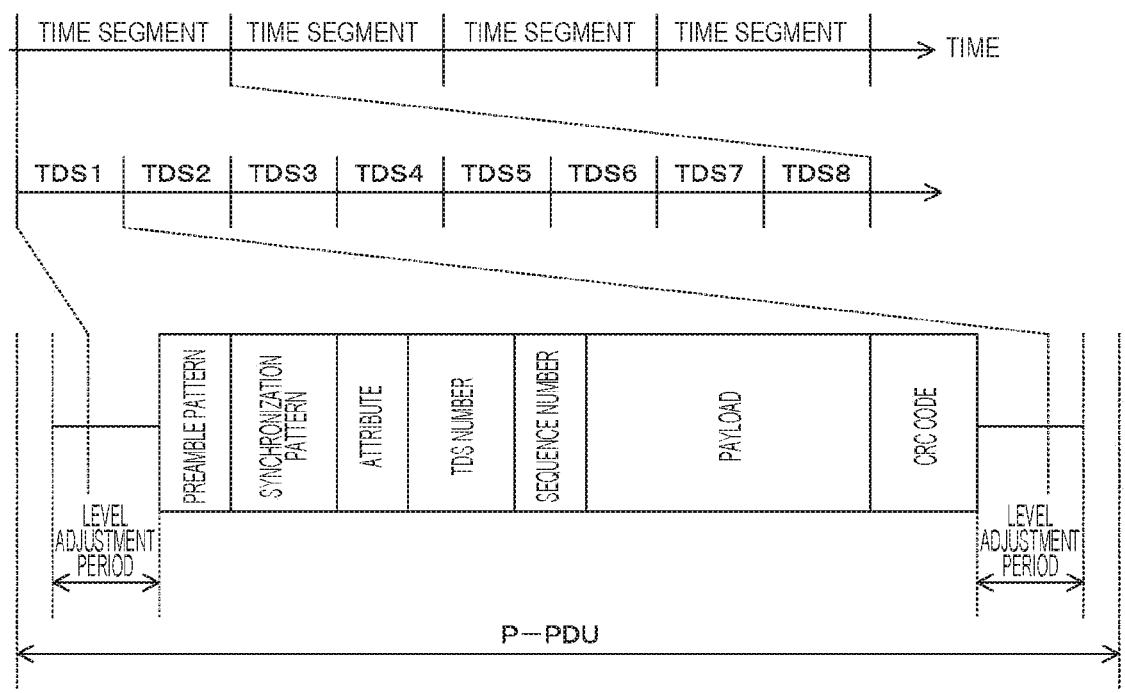
FIG. 11 is a diagram illustrating a configuration example of a time segment and a P-PDU in the first embodiment of the present technology.

FIG. 11 is a block diagram illustrating a configuration example of a data structure of a P-PDU and a time segment in the first embodiment. In Close Capacitive Coupling Communication (CCCC) Physical Layer (PHY) of ISO/IEC 17982, ECMA-401, a time period is divided into units referred to as time segments. Then, each of these time segments is divided into eight time slots each referred to as a Time Division Slot (TDS). In the TDS, a packet referred to as a P-protocol data unit (PDU) is transmitted and received. The P-PDU includes a preamble pattern, a synchronization pattern, an attribute, a TDS number, a sequence number, a payload, and a Cyclic Redundancy Check (CRC) code in order from the top. In addition, a constant level adjustment period is provided immediately before the preamble pattern and immediately after the CRC code.

FIG. 12 is a diagram illustrating an example of a specification for each frequency division channel in the first embodiment. In ISO/IEC 17982, ECMA-401, frequency division channels (FDCs) of 0 to 4 are used. In these FDCs, specifications vary in a carrier frequency fc, P-PDU length, time segment length, listening period, and the like. Then, in a case where the FDC is any of 0 to 3, the carrier frequency is lower than a case where the FDC is 4, and is 13.56 megahertz (MHz) or less. As described above, since the S/N ratio is less likely to decrease as the carrier frequency is lower, it is desirable that the communication apparatus 100 uses FDCs 0 to 3. For example, in a case where the FDC is 2, the carrier frequency is 8.136 megahertz (MHz), and even if an average value of jitter is 3 nanoseconds (ns), the degradation of the S/N ratio is only 0.5 decibel (dB) or less.

FIG. 13 is a diagram illustrating an example of a specification for each communication standard in the first embodiment. As illustrated in the figure, in ISO/IEC 14443 and FeliCa (registered trademark), the carrier frequency is low as 13.56 megahertz (MHz), and a communication speed (data rate) is also low as 106, 212, or 424 kilobits per second (kbps). For this reason, the influence of the jitter is small, and the problems such as the degradation of the S/N ratio hardly occur.

FIG. 14 is a diagram illustrating an example of a specification of the NFC Forum standard in the first embodiment. As illustrated in the figure, in NFC, as compared to LTE and the like, the carrier frequency is lower, and the data rate is also lower. For this reason, the influence of the jitter is small, and even if the frequency of the reference clock ($CLK_{RTC}$) of the phase-locked loop 130 is low, the problem hardly occurs.

Figure 15:
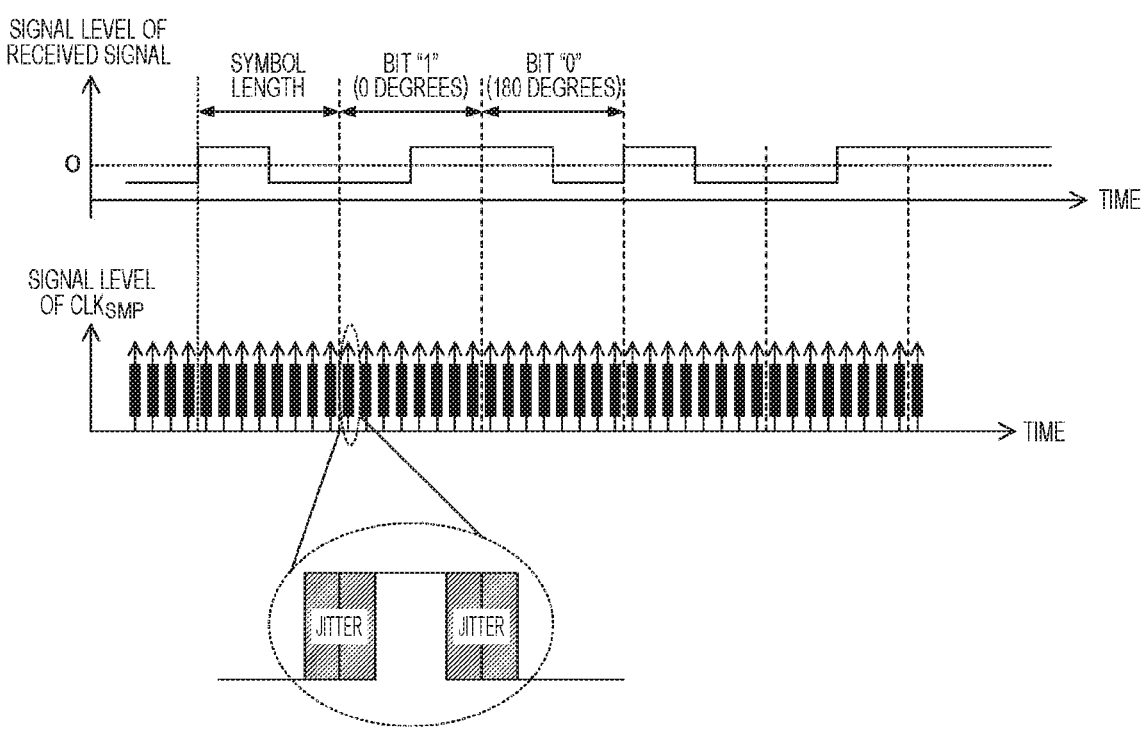
FIG. 15 is a view illustrating an example of a received signal before AD conversion and sampling timing of a sampling clock signal in the first embodiment of the present technology.

FIG. 15 is a diagram illustrating an example of the received signal before AD conversion and sampling timing of the sampling clock signal $CLK_{SMP}$ in the first embodiment. In binary phase-shift keying (BPSK), one bit is modulated on a transmitting side, for each symbol. In addition, on a receiving side, one bit is demodulated for each symbol. For example, when "1" is modulated on the transmitting side, a phase of the transmission signal is controlled to 0 degrees, and when "0" is modulated, the phase is controlled to 180 degrees. On the other hand, on the receiving side, the received signal is sampled in synchronization with the sampling clock signal $CLP_{SMP}$, and a bit of "1" is taken out when the phase of 0 degrees is detected, and a bit of "0" is taken out when the phase of 180 degrees is detected.

Here, as the frequency decreases of the reference clock ($CLK_{RTC}$), jitter increases of the sampling clock signal $CLK_{SMP}$ generated from the reference clock. However, as the symbol length is longer, the influence of the jitter is less. For example, in NFC, the carrier frequency is 13.56 megahertz (MHz). In this case, the communication apparatus 100 performs AD conversion with a sampling clock signal $CLK_{SMP}$ of 3.39 megahertz (MHz) obtained by frequency-dividing the carrier frequency by a frequency division ratio of 4. As a result, as illustrated in FIG. 15, the symbol length is 2.36 microseconds (μs) that is eight times the period of the sampling clock signal $CLK_{SMP}$, and degradation is slight due to the jitter of about 3 nanoseconds (ns).

Figure 16:
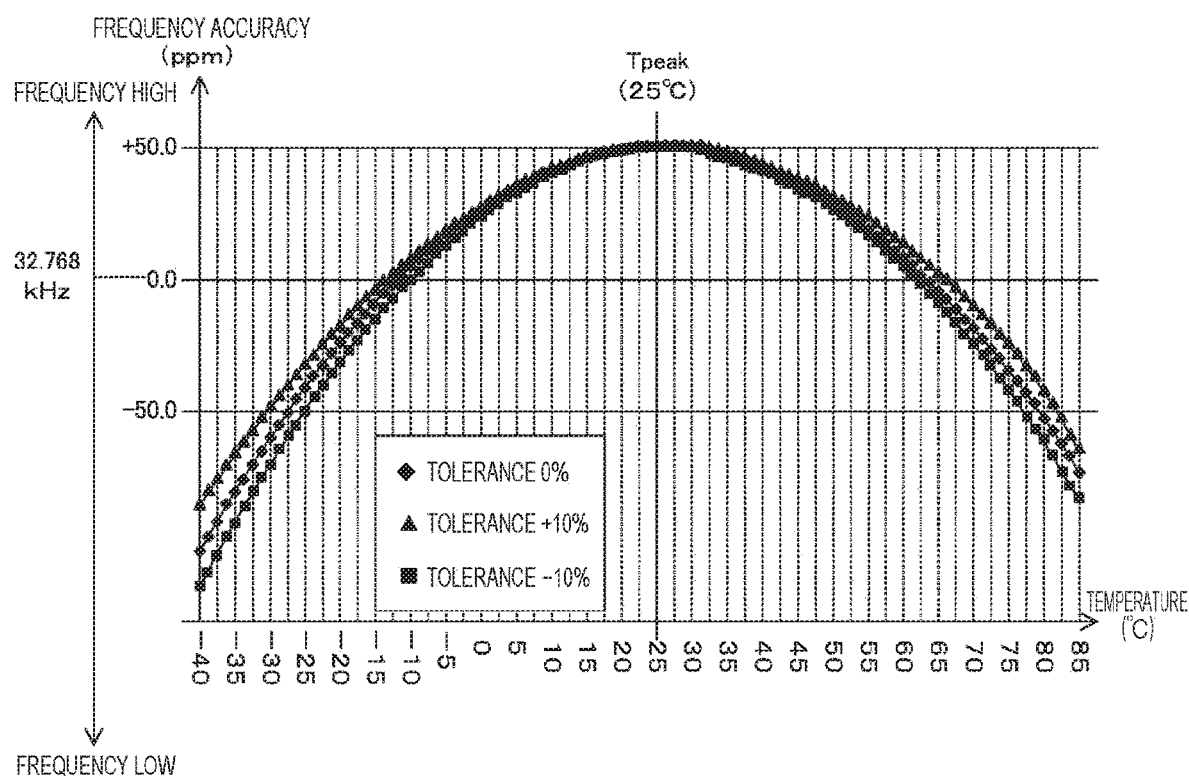
FIG. 16 is a graph illustrating an example of a relationship of temperature characteristics of the crystal oscillator in the first embodiment of the present technology.

FIG. 16 is a graph illustrating an example of temperature characteristics of the crystal oscillator 120 in the first embodiment. In the figure, the vertical axis represents frequency accuracy, and the horizontal axis represents temperature. Here, the frequency accuracy is an absolute error from the nominal frequency of the frequency set under the same environmental condition, and the unit is, for example, ppm (parts per million). In addition, the rhombus indicates a plot in an ideal temperature characteristic with a tolerance of 0%. The triangle indicates a plot in a temperature characteristic when a tolerance of +10% occurs due to product variation. The square indicates a plot in a temperature characteristic when a tolerance of −10% occurs due to product variation.

As the temperature characteristic of the crystal oscillator, a characteristic is known in which a curve indicating a relationship between the temperature and the frequency is a cubic curve, or the curve is a quadratic curve with a peak of frequency around normal temperature or the like. What curve the curve representing the temperature characteristic will be, is determined by a cutting method of the crystal resonator or the like. Among them, as illustrated in FIG. 14, a crystal oscillator having a temperature characteristic of a quadratic curve is arranged in the real-time clock 110. This temperature characteristic is expressed, for example, by the following equation.

$$f_a = -c(T-a)^2 + b \qquad \text{equation 1}$$

In the above equation, $f_a$ is frequency accuracy. T is the temperature, and the unit is, for example, ° C. In the temperature characteristic expressed by this equation, when the temperature T is a, the frequency accuracy $f_a$ is a peak value b.

In general, in a crystal oscillator having a temperature characteristic of a quadratic curve, the frequency characteristic is adjusted such that the peak value b of the frequency accuracy is 0.0 ppm at the normal temperature such as 25° C. On the other hand, in the crystal oscillator 120, unlike the general setting, as illustrated in FIG. 14, the peak value of the frequency accuracy at the normal temperature is adjusted to a value slightly greater than 0.0 ppm (+50.0 ppm) or the like. This adjustment is performed, for example, by attaching an external capacitor or the like. By setting in this way, even if the temperature deviates somewhat from around the normal temperature, the frequency accuracy is a value close to 0.0 ppm, and a frequency deviation from a center frequency can be suppressed.

When the frequency accuracy (error) around the normal temperature is set to be greater than 0.0 ppm in this way, a problem occurs that an error of the time clocked or the like increases, around the normal temperature. Therefore, in the phase-locked loop 130 of the latter stage of the real-time clock 110, the multiplication ratio is set to a value higher than a value obtained by dividing the carrier frequency or the frequency of the baseband signal by the nominal frequency of the crystal oscillator 120. For example, if the carrier frequency is 13.56 megahertz (MHz) and the nominal frequency is 32.768 kilohertz (kHz), a value of (carrier frequency)/(nominal frequency) is about 413.81836. In this case, for the crystal oscillator 120, a multiplication ratio is set slightly greater than 413.81836, for example, 413.83491. With this setting, the frequency accuracy of the clock signal $CLK_{PLL}$ from the phase-locked loop 130 can be shifted upward by about 40 ppm, and the frequency deviation can be suppressed in a case where temperature fluctuation is considered.

Operation Example of Communication Apparatus

Figure 17:
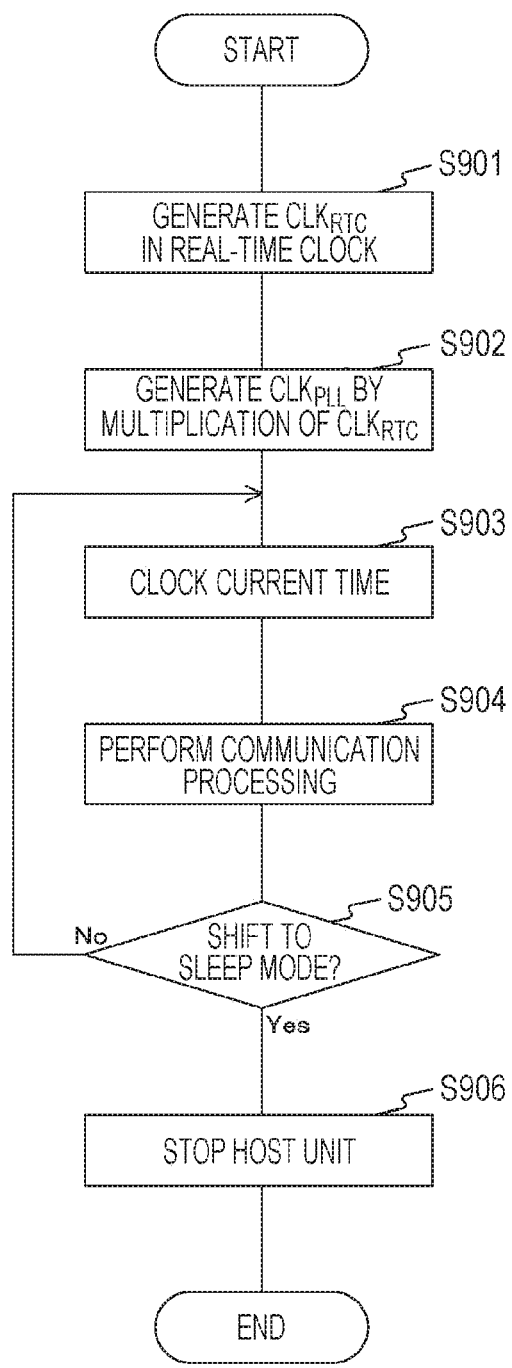
FIG. 17 is a flowchart illustrating an example of operation of a communication apparatus in the first embodiment of the present technology.

FIG. 17 is a flowchart illustrating an example of operation of the communication apparatus 100 in the first embodiment. The operation of the communication apparatus 100 is started, for example, in a case where power to the communication apparatus 100 is turned on, or in a case where an application is executed that performs communication processing.

The communication apparatus 100 starts generating the clock signal $CLK_{RTC}$ in the real-time clock 110 (step S901). In addition, the communication apparatus 100 starts generating the clock signal $CLK_{PLL}$ by multiplying the clock signal $CLK_{RTC}$ (step S902). Then, the communication apparatus 100 clocks the current time in synchronization with the clock signal $CLK_{RTC}$ (step S903), and performs the communication processing in synchronization with the clock signal $CLK_{PLL}$ (step S904).

The host unit 150 in the communication apparatus 100 determines whether or not to shift to the sleep mode (step S905). In a case where the operation is shifted to the sleep mode (step S905: Yes), a power management IC (PMIC) or the like cuts off the power supply to the host unit 150 and stops the host unit 150, in response to the power cutoff request from the host unit 150 (step S906). Then, the communication apparatus 100 ends processing other than the communication processing. In a case where the operation is not shifted to the sleep mode (step S905: No), the communication apparatus 100 repeatedly executes the processing of step S903 and subsequent steps.

Incidentally, when the operation returns from the sleep mode to the normal mode, the communication unit 101 supplies the interrupt signal to the host unit 150. In FIG. 15, the operation at the time of return is omitted.

As described above, since the circuit such as the non-contact communication processing unit 200 other than the host unit 150 is operated also in the sleep mode, the communication apparatus 100 can perform the communication processing even during the sleep mode. For this reason, for example, it is possible to implement operation of returning from the sleep mode, triggered by reception of a predetermined received signal from a communication partner (access point, another terminal, or the like) during the sleep mode. In addition to the real-time clock 110, a crystal oscillator on the order of megahertz is provided, and the communication processing can be performed during the sleep mode with the clock signal from the crystal oscillator; however, in this configuration, power consumption is increased by the amount for the crystal oscillator.

In addition, since the frequency of the reference clock ($CLK_{RTC}$) of the phase-locked loop 130 is very low as compared with the carrier frequency and the frequency of the baseband signal, there is almost no concern that harmonics generated from the reference clock interfere with the frequency band of communication.

Incidentally, the communication apparatus 100 is configured to perform both the clocking and the communication processing in the sleep mode; however, the communication apparatus 100 may be configured to perform only one of them. For example, in a case where only the clocking is performed in the sleep mode, the non-contact communication processing unit 200 may be stopped. As a result, power consumption in the sleep mode can be further reduced.

As described above, according to the first embodiment of the present technology, the clocking is performed in synchronization with the clock signal from the crystal oscillator in the real-time clock 110, and the communication processing is performed in synchronization with the signal obtained by multiplying the clock signal, so that it is possible to perform the clocking and the communication processing with one crystal oscillator. As a result, power consumption can be reduced as compared with a configuration in which the clocking and the communication processing are performed by multiple crystal oscillators.

2. Second Embodiment

In the first embodiment described above, the communication apparatus 100 performs non-contact communication; however, communication other than non-contact communication may be performed as long as it is communication with little influence of the jitter. For example, human body communication using a human body that is a dielectric as a communication medium has a relatively low carrier frequency, so that the influence of the jitter is small. A communication apparatus 100 of a second embodiment is different from the first embodiment in that human body communication is performed instead of non-contact communication.

Figure 18:
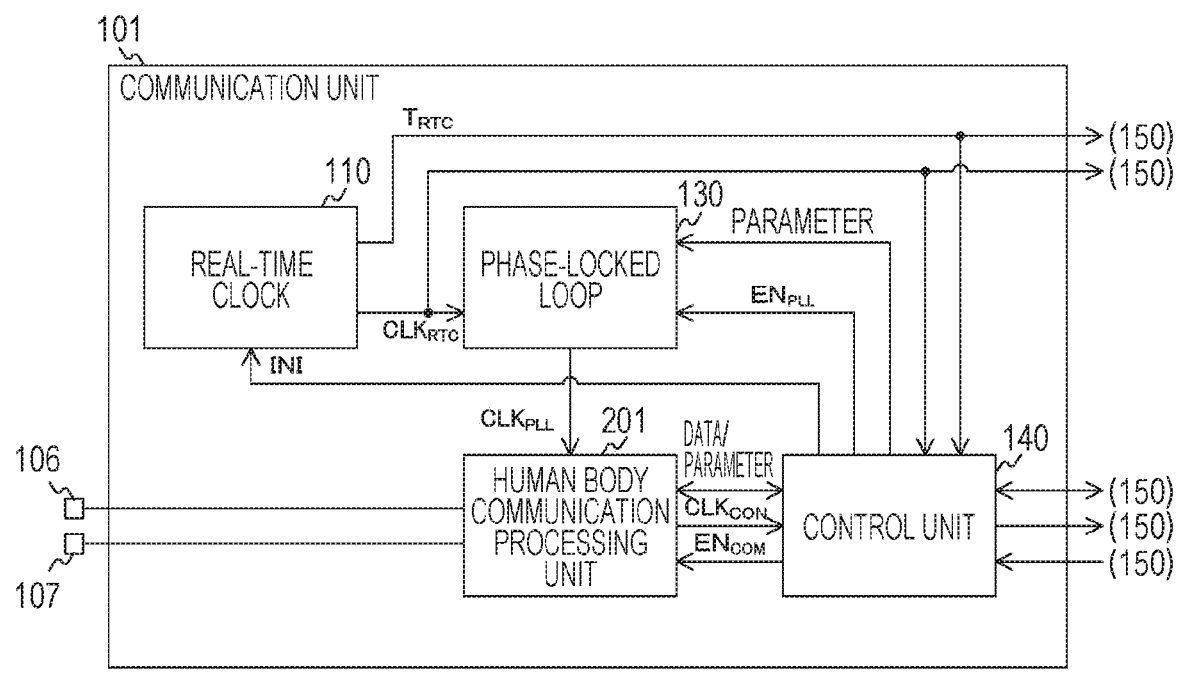
FIG. 18 is a block diagram illustrating a configuration example of a communication unit in a second embodiment of the present technology.

FIG. 18 is a block diagram illustrating a configuration example of a communication unit 101 in the second embodiment. The communication unit 101 of the second embodiment is different from the first embodiment in that a human body communication processing unit 201 is provided instead of the non-contact communication processing unit 200. In addition, electrodes 106 and 107 are attached to the communication apparatus 100 instead of the antenna 105.

The electrodes 106 and 107 transmit and receive a differential signal via the human body. In addition, the human body communication processing unit 201 demodulates the differential signal from the electrodes 106 and 107, and supplies a modulated differential signal to those electrodes.

Configuration Example of Human Body Communication Unit

Figure 19:
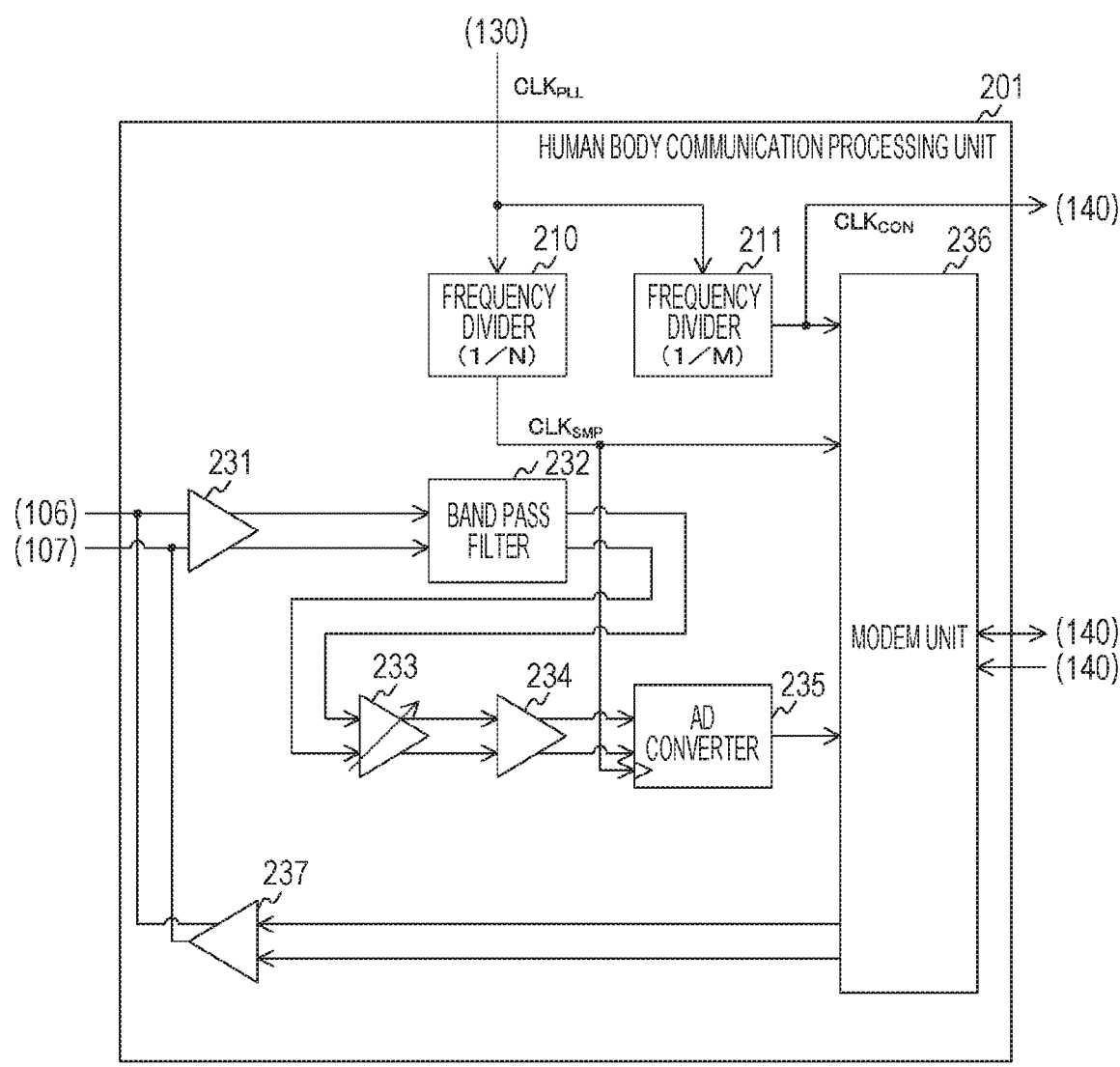
FIG. 19 is a block diagram illustrating a configuration example of a human body communication processing unit in the second embodiment of the present technology.

FIG. 19 is a block diagram illustrating a configuration example of the human body communication processing unit 201 in the second embodiment. The human body communication processing unit 201 includes frequency dividers 210 and 211, a reception amplifier 231, a band pass filter 232, an automatic gain control unit 233, a buffer 234, an AD converter 235, a modem unit 236, and a transmission amplifier 237.

The reception amplifier 231 receives the differential signal from the electrodes 106 and 107 as a received signal, amplifies the differential signal, and supplies the amplified signal to the band pass filter 232. The band pass filter 232 allows a component of a passband in a certain range to pass, in the received signal from the reception amplifier 231. The configurations of the automatic gain control unit 233, the buffer 234, the AD converter 235, and the modem unit 236 are similar as those of the automatic gain control unit 216, the buffer 217, the AD converter 218, and the modem unit 222 except that the differential signal is processed. The transmission amplifier 237 amplifies a transmission signal from the modem unit 236 and supplies the amplified signal to the electrodes 106 and 107.

Figure 20:
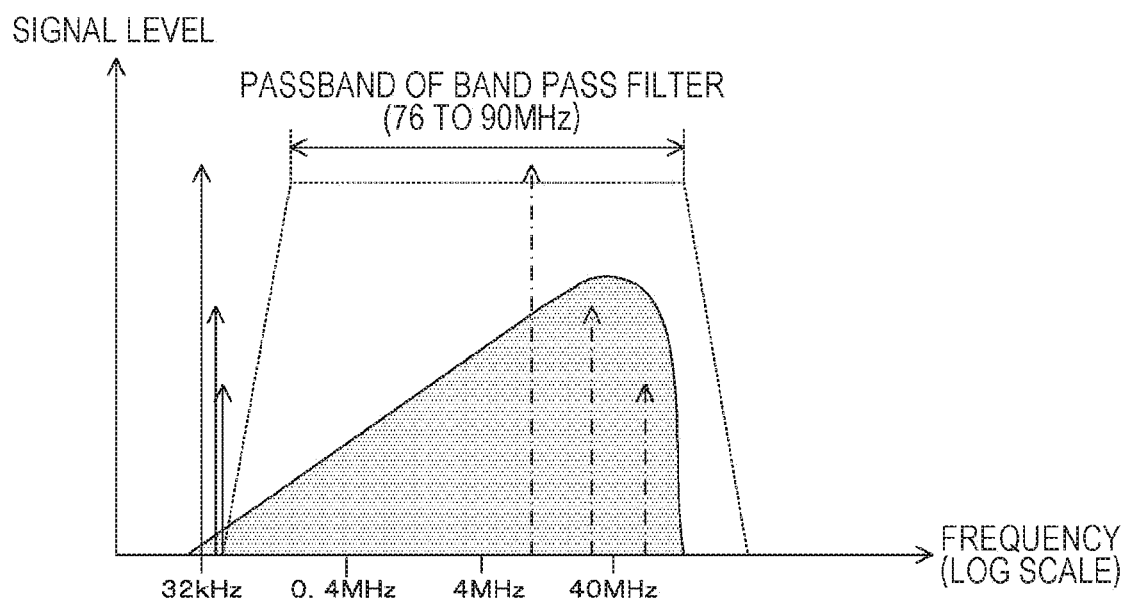
FIG. 20 is a diagram for explaining interference between a baseband signal and spurious in the second embodiment of the present technology.

FIG. 20 is a diagram for explaining interference between a baseband signal and spurious in the second embodiment. In the figure, the vertical axis illustrates a signal level, and the horizontal axis illustrates a frequency in the log scale. In addition, the solid line curve indicates a frequency characteristic of the baseband signal in a case where the FDC is set to 4. As illustrated in the figure, the level of the baseband signal is the largest at around 40 megahertz (MHz).

In addition, the solid arrows indicate the signal levels of the fundamental and harmonics of the oscillator generated from the real-time clock 110. Since the harmonics are non-target signals, they are treated as spurious. The spurious occurs in a very low frequency band around 32 kilohertz (KHz) and hardly interferes with the baseband signal around 40 megahertz (MHz). In addition, spurious can be easily removed by setting a passband including around 40 megahertz (MHz) and not including around 32 kilohertz (kHz), for the band pass filter 232.

Incidentally, the dash-dot arrows each indicate spurious generated from the oscillator in a case where a crystal oscillator oscillating at 19.2 MHz is further provided. If such a crystal oscillator is provided, spurious occurs in a band where the signal level of the baseband signal is comparatively high, and there is a possibility that the spurious interferes with the baseband signal.

As described above, according to the second embodiment of the present technology, the clocking is performed in synchronization with the clock signal from the crystal oscillator 120, and human body communication is performed in synchronization with the signal multiplied by the clock signal, so that power consumption can be reduced in human body communication.

3. Third Embodiment

In the first embodiment described above, the communication apparatus 100 performs both the clocking and non-contact communication processing in synchronization with the clock signal $CLK_{RTC}$ from the crystal oscillator 120. In the non-contact communication standard, it is possible to use multiple channels (FDCs 0 to 4, or the like) having respective different carrier frequencies, and the influence of the jitter is small in the channel having a relatively low carrier frequency as described above. However, in a channel with a relatively high carrier frequency, the influence of the jitter increases, and there is a possibility that problems occur such as degradation of the S/N ratio. A communication apparatus 100 of a third embodiment is different from the first embodiment in that degradation of the S/N ratio is suppressed even in a case where the carrier frequency is high.

Figure 21:
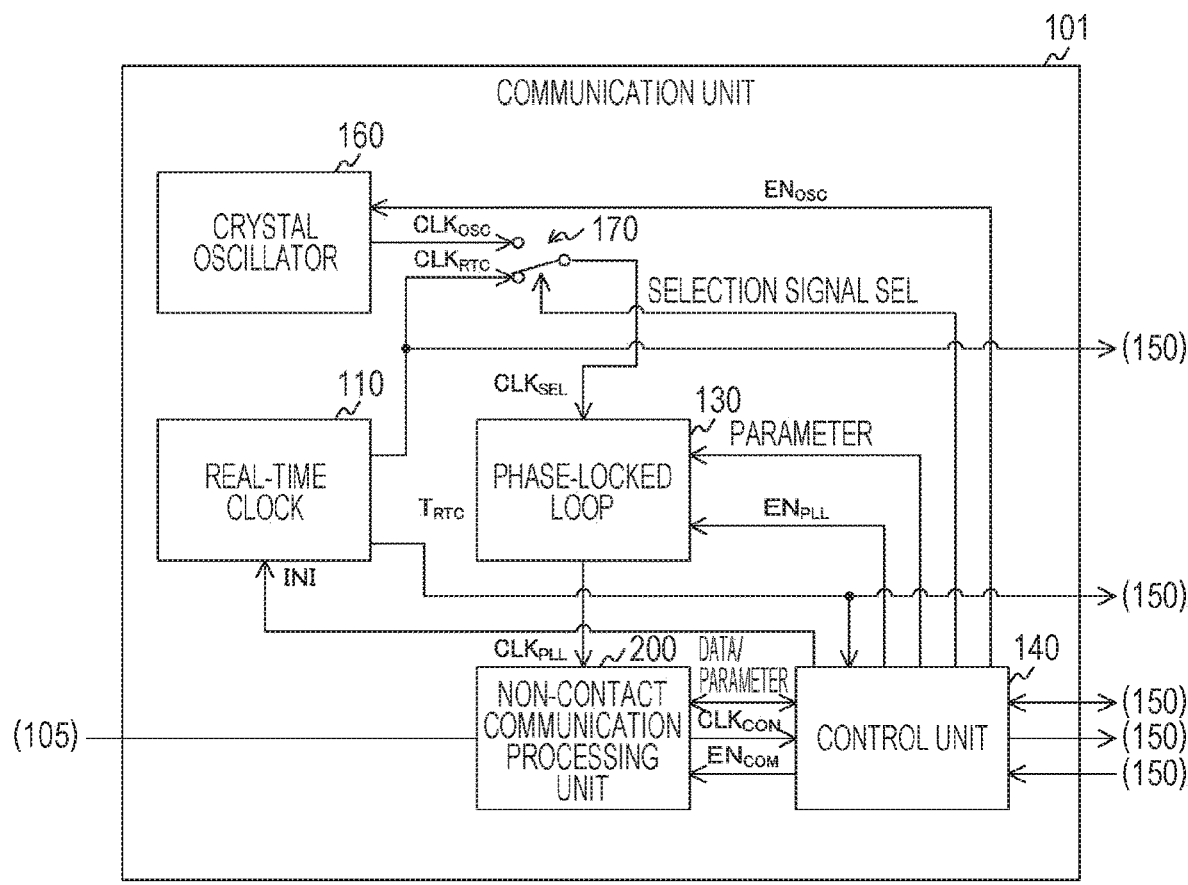
FIG. 21 is a block diagram illustrating a configuration example of a communication unit in a third embodiment of the present technology.

FIG. 21 is a block diagram illustrating a configuration example of a communication unit 101 in the third embodiment. The communication unit 101 of the third embodiment is different from the first embodiment in that a crystal oscillator 160 and a switch 170 are further included.

The crystal oscillator 160 generates a clock signal $CLK_{OSC}$ having a higher frequency than the clock signal $CLK_{RTC}$ from the real-time clock 110. The frequency of the clock signal $CLK_{OSC}$ is set, for example, on the order of megahertz (MHz). Specifically, 19.2 megahertz (MHz) or the like is set as the frequency of the clock signal $CLK_{OSC}$. In addition, an enable signal $EN_{OSC}$ is input to the crystal oscillator 160, the enable signal $EN_{OSC}$ indicating whether or not the crystal oscillator 160 is caused to oscillate. For example, the enable signal $EN_{OSC}$ is set to a high level in a case where the crystal oscillator 160 is caused to oscillate, and is set to a low level is in a case where the crystal oscillator 160 is caused to stop. The crystal oscillator 160 generates the clock signal $CLK_{OSC}$ in a case where the enable signal $EN_{OSC}$ is at the high level and supplies the clock signal $CLK_{OSC}$ to the switch 170. Incidentally, the crystal oscillator 160 is an example of a high frequency signal generating unit described in the claims.

In addition, the real-time clock 110 of the second embodiment supplies the clock signal $CLK_{RTC}$ to the switch 170 instead of the phase-locked loop 130.

The switch 170 selects either the clock signal $CLK_{RTC}$ or the clock signal $CLK_{OSC}$ in accordance with the selection signal SEL. The switch 170 supplies the selected signal as the clock signal $CLK_{SEL}$ to the phase-locked loop 130. Incidentally, the switch 170 is an example of a selection unit described in the claims.

A control unit 140 of the third embodiment sets in a non-contact communication processing unit 200 whether to use any of FDCs 0 to 4, and controls the selection signal SEL in accordance with the carrier frequency of the FDC. For example, in a case where the carrier frequency of the set channel is higher than a predetermined frequency (for example, 13.56 MHz), the clock signal $CLK_{OSC}$ is selected by the switch 170, and otherwise, the clock signal $CLK_{RTC}$ is selected. Incidentally, the control unit 140 is an example of a setting unit described in the claims.

In addition, the control unit 140 sets the enable signal $EN_{OSC}$ to high to operate the crystal oscillator 160 in a case where the clock signal $CLK_{OSC}$ is to be selected, and sets the enable signal $EN_{OSC}$ to low to stop the crystal oscillator 160 in a case where the clock signal $CLK_{RTC}$ is to be selected.

In addition, in the case where the clock signal $CLK_{OSC}$ is to be selected, the control unit 140 controls the frequency division ratio DIV of the phase-locked loop 130 to a value $DIV_{OSC}$ slightly higher than $fc/f_{osc}$. Here, fc is the carrier frequency and $f_{osc}$ is the frequency of the clock signal $CLK_{OSC}$. On the other hand, in the case where the clock signal $CLK_{RTC}$ is to be selected, the control unit 140 controls the frequency division ratio DIV to a value $DIV_{RTC}$ slightly higher than $fc/f_{RTC}$. Here, $f_{RTC}$ is the frequency of the clock signal $CLK_{RTC}$.

In addition, the communication apparatus 100 uses the clock signal $CLK_{OSC}$ generated by the internal crystal oscillator 160 as a reference clock; however, a clock signal input from an external apparatus (such as a host computer) of the communication apparatus 100 may be used as the reference clock. In this case, the host unit 150 stops the crystal oscillator 160.

Figures 22, 23:
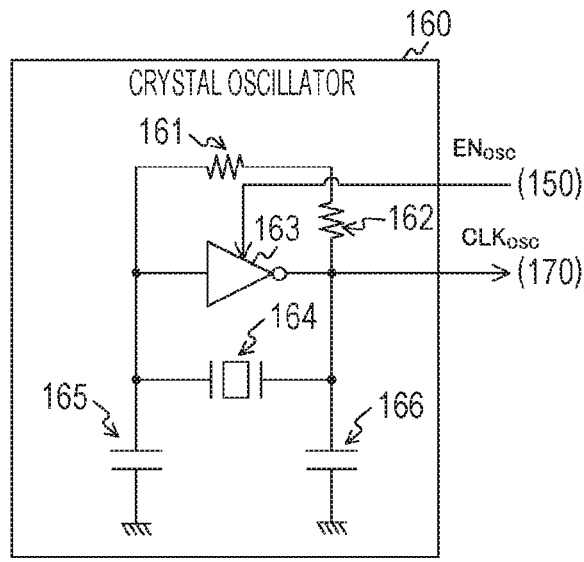
FIG. 22 is a circuit diagram illustrating a configuration example of a crystal oscillator in the third embodiment of the present technology.
FIG. 23 is a diagram illustrating a setting example of a selection signal, an enable signal, and a frequency division ratio for each frequency division channel in the third embodiment of the present technology.

FIG. 22 is a circuit diagram illustrating a configuration example of the crystal oscillator 160 in the third embodiment. The crystal oscillator 120 includes resistors 161 and 162, an inverter 163, a crystal resonator 164, and capacitors 165 and 166. The configuration is similar to the crystal oscillator 120 except that the inverter 163 is an inverter with an enable terminal. An enable signal EN from the host unit 150 is input to the enable terminal.

The inverter 163 inverts and outputs an input signal in a case where the enable signal EN is at the high level, and sets the output to high impedance otherwise. As a result, in the case where the enable signal EN is at the high level, the crystal oscillator 160 oscillates to generate the clock signal $CLK_{OSC}$, and otherwise, the crystal oscillator 160 stops.

FIG. 23 is a diagram illustrating a setting example of a selection signal, an enable signal, and a frequency division ratio for each frequency division channel in the third embodiment. In a case where the FDC is any of 0 to 3, the carrier frequency is lower than in a case where the FDC is 4. In this case, $CLK_{RTC}$ is selected by the selection signal SEL, the low level is set to the enable signal EN, and $DIV_{RTC}$ is set to the frequency division ratio DIV.

Here, a case is considered where sampling is performed with a sampling clock signal $CLK_{SMP}$ having a frequency of four times the carrier frequency in accordance with ISO/IEC 17982. When the sampling clock signal $CLK_{SMP}$ is generated from 32.768 kilohertz (kHz), time variation of jitter occurring in the signal $CLK_{SMP}$ is expected to be about several nanoseconds (ns). On the other hand, in a case where the sampling clock signal $CLK_{SMP}$ is generated from 19.2 megahertz (MHz), the time variation of the jitter is shorter than 1 nanosecond (ns). Due to the jitter, an S/N ratio with respect to Packet Error Rate (PER) is degraded. To avoid degradation of communication performance, for example, an allowable value of a required S/N ratio degradation of PER 0.001 or less is set to 1 decibel or less. When the FDC is any of 0 to 3, even if $CLK_{RTC}$ is selected, the degradation of the S/N ratio is 0.1 decibels (dB) or less and falls below the allowable value.

In addition, in a case where the FDC is any of 0 to 3, the crystal oscillator 160 is stopped by the enable signal EN, so that power consumption can be reduced by an amount for the crystal oscillator 160.

On the other hand, in a case where the FDC is 4, the carrier frequency is the highest. In this case, if the clock signal $CLK_{RTC}$ is selected, the S/N ratio is degraded by, for example, more than 3 decibels (dB) due to the influence of the jitter and exceeds the allowable value. Therefore, in this case, $CLK_{OSC}$ is selected by the selection signal SEL, the high level is set for the enable signal EN, and $DIV_{OSC}$ is set as the frequency division ratio DIV. As a result, the high-frequency clock signal $CLK_{OSC}$ is input to the phase-locked loop 130, so that the jitter generated in the phase-locked loop 130 is reduced, and degradation of the S/N ratio can be suppressed.

Incidentally, in a case where the communication apparatus 100 performs baseband communication instead of modulating and demodulating a signal superimposed on a carrier, the clock signal $CLK_{OSC}$ is selected in a case where the frequency of the baseband communication is higher than a predetermined frequency, instead of the carrier frequency.

Figure 24:
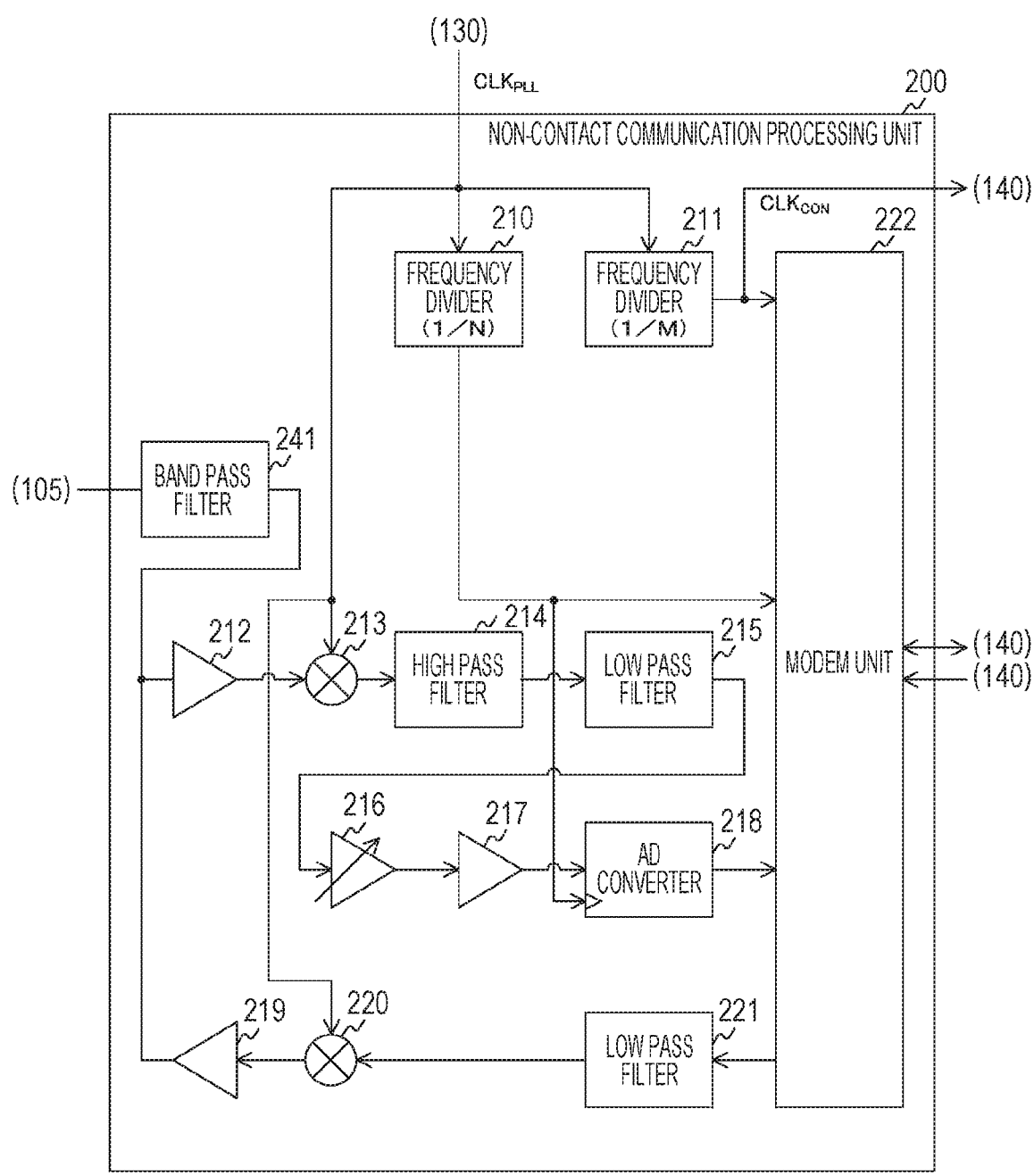
FIG. 24 is a block diagram illustrating a configuration example of a non-contact communication processing unit in the third embodiment of the present technology.

FIG. 24 is a block diagram illustrating a configuration example of the non-contact communication processing unit 200 in the third embodiment. The non-contact communication processing unit 200 is different from the first embodiment in that a band pass filter 241 is further included. The band pass filter 241 is arranged between the antenna 105 and the low noise amplifiers 212 and 219.

As described above, according to the third embodiment of the present technology, the communication apparatus 100 selects the clock signal $CLK_{OSC}$ in a case where the carrier frequency or the frequency of the baseband signal is higher than the predetermined frequency, so that the degradation of the S/N ratio can be suppressed in a case where the carrier frequency or the like is high.

Modification

In the third embodiment described above, the communication apparatus 100 performs non-contact communication; however, human body communication may be performed instead. A communication apparatus 100 of a modification of the third embodiment is different from the third embodiment in that human body communication is performed instead of non-contact communication.

Figure 25:
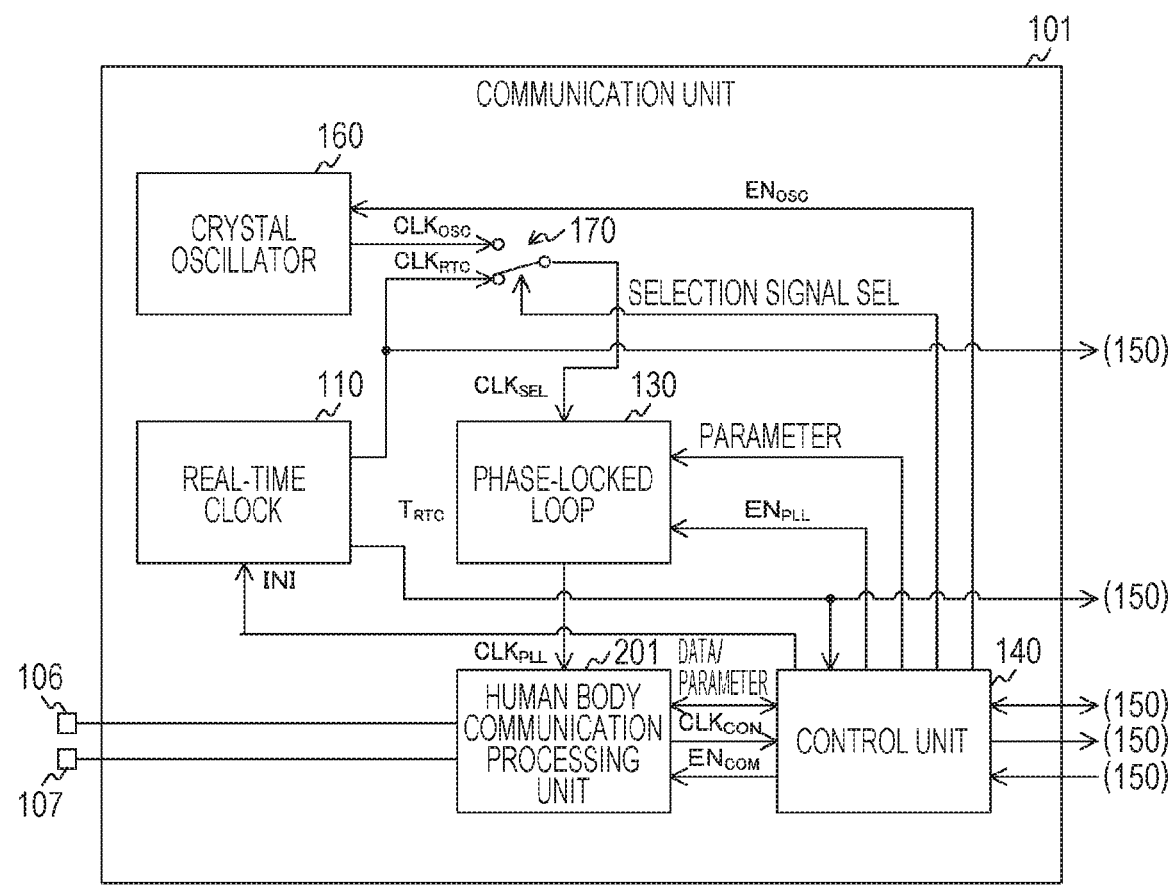
FIG. 25 is a block diagram illustrating a configuration example of a communication unit in a modification of the third embodiment of the present technology.

FIG. 25 is a block diagram illustrating a configuration example of a communication unit 101 in the modification of the third embodiment. The communication unit 101 of the modification is different from the third embodiment in that a human body communication processing unit 201 is provided instead of the non-contact communication processing unit 200. In addition, electrodes 106 and 107 are attached to the communication apparatus 100 instead of the antenna 105. The configurations of the human body communication processing unit 201, and the electrodes 106 and 107 are similar to those of the second embodiment.

As described above, according to the modification of the third embodiment of the present technology, in the case where the carrier frequency or the frequency of the baseband signal is higher than a certain value, the clock signal is selected and human body communication is performed, so that the degradation of the S/N ratio can be suppressed in a case where the frequency or the like is high in human body communication.

4. Fourth Embodiment

In the first embodiment described above, the real-time clock 110 is arranged outside the host unit 150. However, in a case where a real-time clock is mounted in the host unit 150, it is sufficient to share the real-time clock in the non-contact communication processing unit 200, so that there is no need to further provide the real-time clock 110. A communication apparatus 100 of a fourth embodiment is different from the first embodiment in that the real-time clock is not provided outside a host unit 150.

Figure 26:
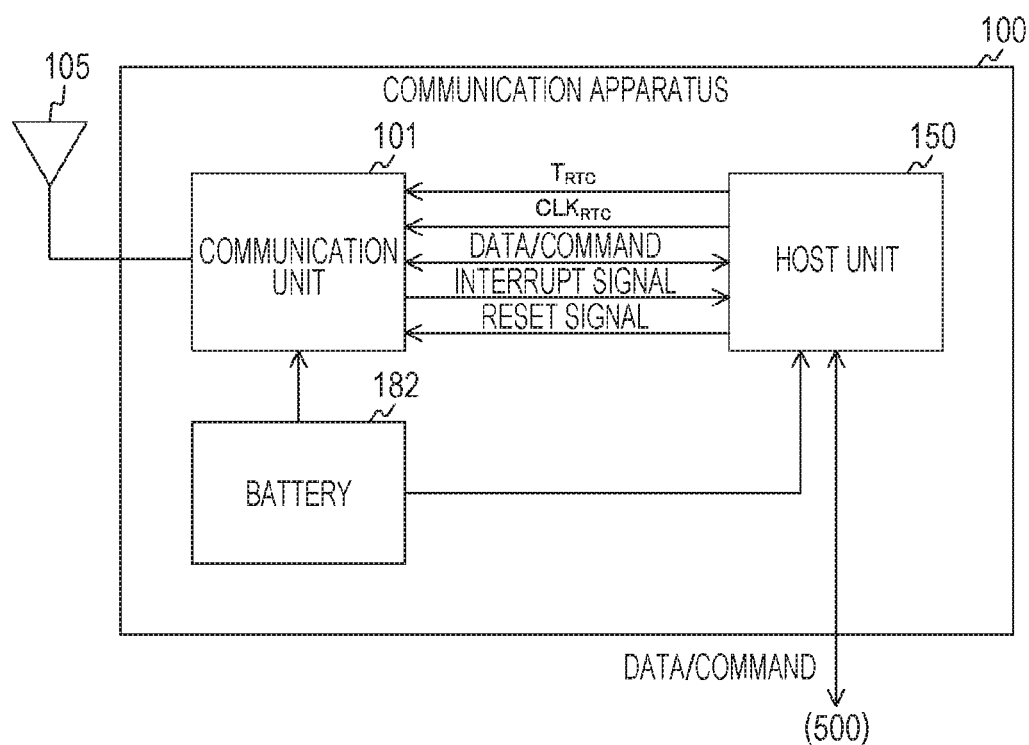
FIG. 26 is a block diagram illustrating a configuration example of a communication apparatus in a fourth embodiment of the present technology.

FIG. 26 is a block diagram illustrating a configuration example of the communication apparatus 100 in the fourth embodiment. The fourth communication apparatus 100 further includes a battery 182. The battery 182 stores charged electricity and supplies the electricity to a communication unit 101 and the host unit 150. In addition, the host unit 150 of the fourth embodiment is different from the first embodiment in that the clock signal $CLK_{RTC}$ generated by an internal real-time clock and the time information $T_{RTC}$ are supplied to the communication unit 101.

Figure 27:
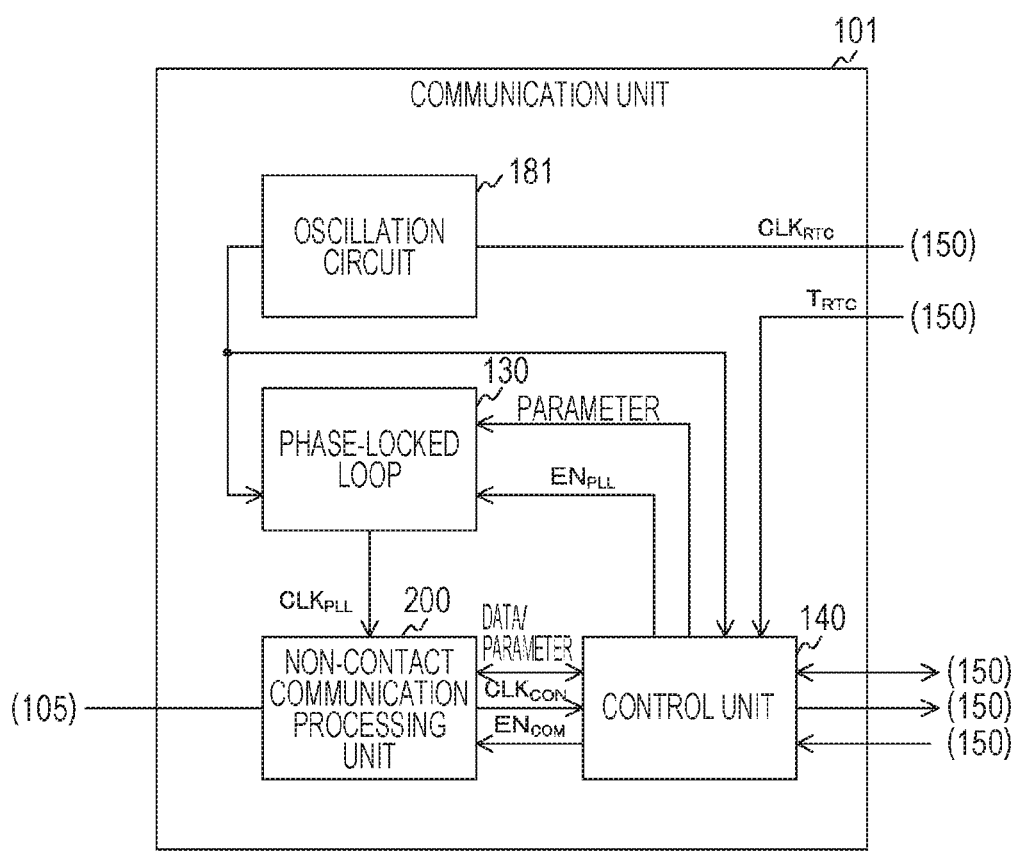
FIG. 27 is a block diagram illustrating a configuration example of a communication unit in the fourth embodiment of the present technology.

FIG. 27 is a block diagram illustrating a configuration example of the communication unit 101 in the fourth embodiment. In the fourth communication unit 101, a phase-locked loop 130, an oscillation circuit 181, a control unit 140, and a non-contact communication processing unit 200 are arranged. The configurations of the phase-locked loop 130, the control unit 140, and the non-contact communication processing unit 200 are similar to those of the first embodiment.

The host unit 150 generates the clock signal $CLK_{RTC}$ by the internal real-time clock, and supplies the clock signal $CLK_{RTC}$ to the phase-locked loop 130 and the control unit 140 via the oscillation circuit 181. The oscillation circuit 181 is used as a buffer. The battery 182 stores the charged electricity and supplies the electricity to a slave unit 101 and a master unit 102.

Configuration Example of Host Unit

Figure 28:
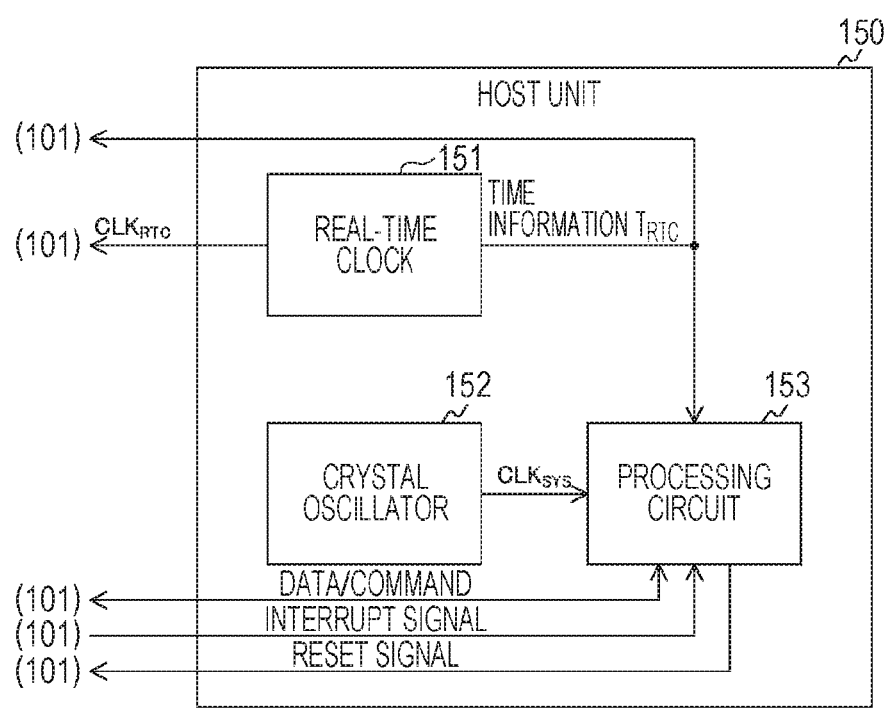
FIG. 28 is a block diagram illustrating a configuration example of a host unit in the fourth embodiment of the present technology.

FIG. 28 is a block diagram illustrating a configuration example of the host unit 150 in the fourth embodiment. The host unit 150 includes a real-time clock 151, a crystal oscillator 152, and a processing circuit 153.

The configuration of the real-time clock 151 is similar to that of the real-time clock 110 of the first embodiment. The real-time clock 151 supplies the clock signal $CLK_{RTC}$ to the oscillation circuit 181, and supplies the time information $T_{RTC}$ to the processing circuit 153 and the communication unit 101.

The crystal oscillator 152 generates a clock signal $CLK_{SYS}$ and supplies the clock signal $CLK_{SYS}$ to the processing circuit 153.

The processing circuit 153 performs various types of processing in synchronization with the clock signal $CLK_{SYS}$. For example, processing of the received data, generation of the transmission data, and the like are performed. Except for the real-time clock 151, circuits such as the crystal oscillator 152 and the processing circuit 153 in the host unit 150 stop in the sleep mode. On the other hand, the communication unit 101 operates even during the sleep mode and can perform the communication processing.

As described above, according to the fourth embodiment of the present technology, the real-time clock 151 in the host unit 150 generates the clock signal $CLK_{RTC}$, so that there is no need to further provide a real-time clock outside the host unit 150.

5. Fifth Embodiment

In the first embodiment described above, the communication apparatus 100 performs both the clocking and non-contact communication processing in synchronization with the clock signal $CLK_{RTC}$ from the crystal oscillator 120. As illustrated in FIG. 14, the frequency of the clock signal $CLK_{RTC}$ decreases as the temperature deviates from the normal temperature, and an error occurs. For this reason, in a temperature range higher than the normal temperature or in a temperature range lower than the normal temperature, jitter occurs due to an error in the frequency, and the S/N ratio may be degraded. A communication apparatus 100 of a third embodiment is different from the first embodiment in that the degradation of the S/N ratio is suppressed even in the temperature range higher than the normal temperature or in the temperature range lower than the normal temperature.

Figure 29:
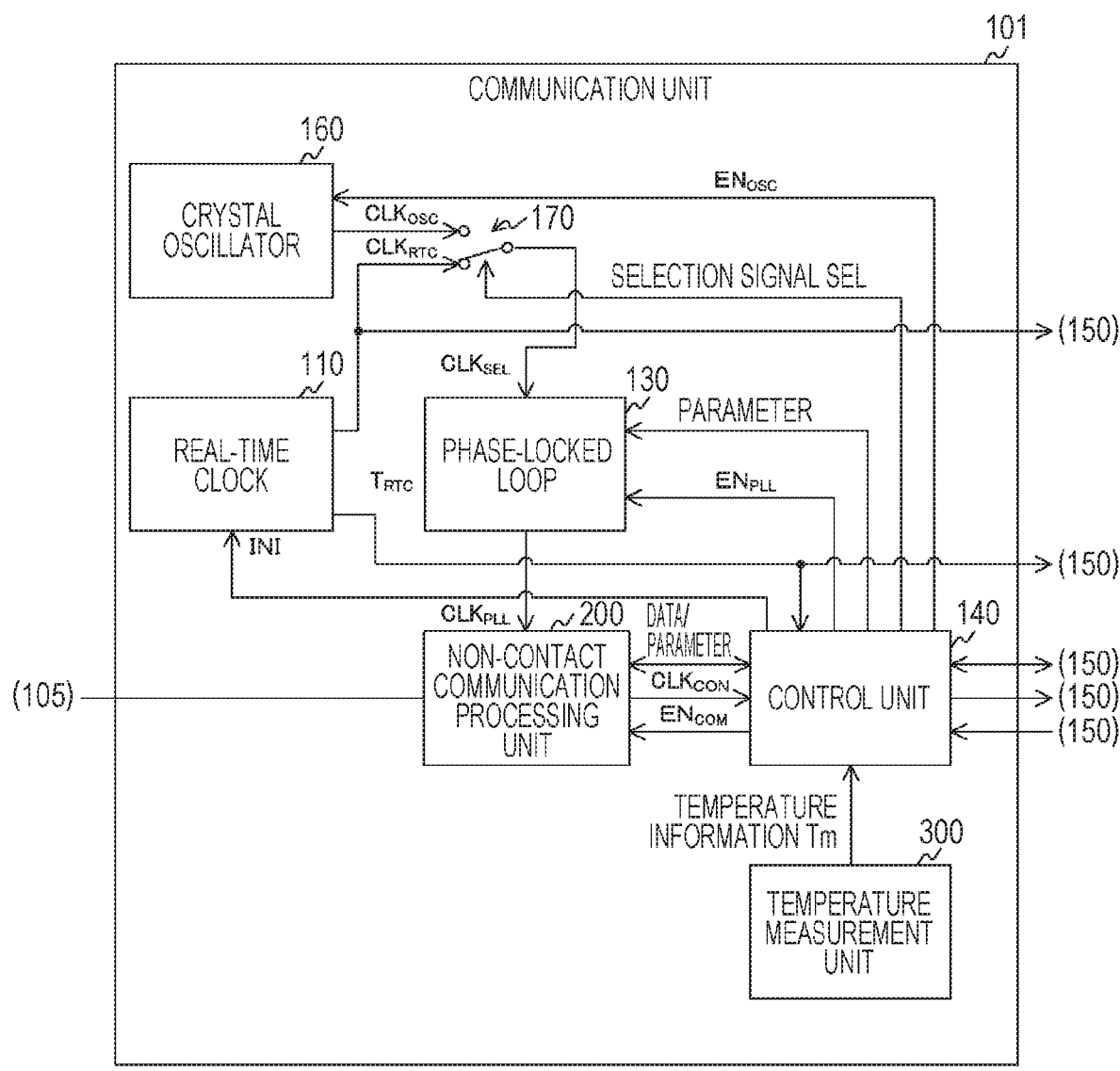
FIG. 29 is a block diagram illustrating a configuration example of a communication unit in a fifth embodiment of the present technology.

FIG. 29 is a block diagram illustrating a configuration example of a communication unit 101 in the fifth embodiment. The communication unit 101 of the fifth embodiment is different from the first embodiment in that a crystal oscillator 160, a switch 170, and a temperature measurement unit 300 are further included. The configurations of the crystal oscillator 160 and the switch 170 are similar to those of the third embodiment.

The temperature measurement unit 300 measures temperature inside the communication apparatus 100. The temperature measurement unit 300 generates temperature information Tm representing the measured temperature with a plurality of bits, and supplies the temperature information Tm to the control unit 140.

The control unit 140 of the fifth embodiment determines whether or not an initial temperature $T_{ini}$ measured immediately after turning on the power of the communication apparatus 100 is within a certain temperature range including the normal temperature on the basis of the temperature information Tm. In a case where the temperature is within the temperature range, the control unit 140 selects the clock signal $CLK_{RTC}$ by the selection signal SEL with the switch 170, and otherwise, selects the clock signal $CLK_{OSC}$.

After controlling the selection signal SEL on the basis of the initial temperature $T_{ini}$, the control unit 140 periodically monitors the measured temperature. Then, in a case where an amount of change in the temperature from the initial temperature $T_{ini}$ exceeds a threshold value, the control unit 140 controls the selection signal SEL on the basis of the temperature after the change, in an empty time slot in which transmission and reception are not performed.

In addition, the control unit 140 sets the enable signal EN to high to operate the crystal oscillator 160 in a case where the clock signal $CLK_{OSC}$ is to be selected, and sets the enable signal EN to low to stop the crystal oscillator 160 in a case where the clock signal $CLK_{RTC}$ is to be selected. In addition, the control unit 140 controls the frequency division ratio DIV of the phase-locked loop 130 to $DIV_{OSC}$ in the case where the clock signal $CLK_{OSC}$ is to be selected, and controls the frequency division ratio DIV to $DIV_{RTC}$ otherwise.

Here, in the temperature range higher than the normal temperature or the temperature range lower than the normal temperature, an error may occur in the frequency in both the crystal oscillator 120 and the crystal oscillator 160. However, as described above, if the clock signal $CLK_{OSC}$ having a higher frequency is selected in these temperature ranges, the jitter is reduced, so that influence of the error can be suppressed.

Incidentally, the control unit 140 controls the enable signal EN, the selection signal SEL, and the frequency division ratio DIV; however, the host unit 150 may control these signals.

Figures 30, 31:
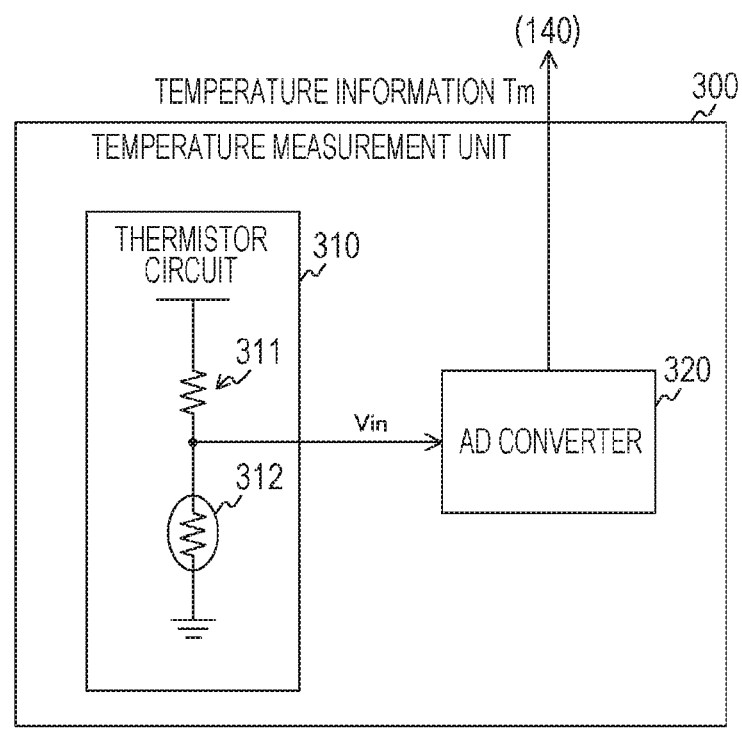
FIG. 30 is a diagram illustrating a setting example a selection signal, an enable signal, and a frequency division ratio for each temperature range in the fifth embodiment of the present technology.
FIG. 31 is a block diagram illustrating a configuration example of a temperature measurement unit in the fifth embodiment of the present technology.

FIG. 30 is a diagram illustrating a setting example of a selection signal, an enable signal, and a frequency division ratio for each temperature range in the fifth embodiment. In a case where the measured temperature is within the temperature range from an upper limit value (for example, 50° C.) to a lower limit value (for example, 0° C.), the error in the frequency of the clock signal $CLK_{RTC}$ from the crystal oscillator 120 is relatively small. In this case, $CLK_{RTC}$ is selected by the selection signal SEL, the low level is set to the enable signal EN, and $DIV_{RTC}$ is set to the frequency division ratio DIV.

On the other hand, in a case where the measured temperature is higher than the upper limit value or lower than the lower limit value, the error in the frequency of the clock signal $CLK_{RTC}$ is relatively large. For this reason, $CLK_{OSC}$ is selected by the selection signal SEL, the high level is set to the enable signal EN, and $DIV_{OSC}$ is set to the frequency division ratio DIV. Since the jitter is reduced by selecting the clock signal $CLK_{OSC}$ having the higher frequency as described above, the degradation of the S/N ratio can be suppressed even if the error occurs in the frequency.

Configuration Example of Temperature Measurement Unit

FIG. 31 is a block diagram illustrating a configuration example of the temperature measurement unit 300 in the fifth embodiment. The temperature measurement unit 300 includes a thermistor circuit 310 and an AD converter 320. The thermistor circuit 310 includes a resistor 311 and a thermistor 312. The resistor 311 and the thermistor 312 are connected in series between a power supply terminal and a ground terminal. In addition, a connection point between the resistor 311 and the thermistor 312 is connected to the AD converter 320.

The thermistor 312 is an element whose resistance varies in accordance with a change in temperature. When the temperature changes, the resistance of the thermistor 312 changes in accordance with the change, and the voltage Vin at the connection point between the resistor 311 and the thermistor 312 changes. The voltage Vin has a lower value as the temperature is higher, for example.

The AD converter 320 performs AD conversion on the analog voltage Vin to generate temperature information Tm of plural bits. As an AD conversion method of the AD converter 320, a successive approximation type, an integration type, and the like are used. The AD converter 320 supplies the generated temperature information Tm to the control unit 140. In this way, the temperature is measured by performing the AD conversion on the voltage corresponding to the temperature. Incidentally, the AD converter 320 is an example of a measurement unit described in the claims.

As described above, according to the fifth embodiment of the present technology, the communication apparatus 100 selects the clock signal having the higher frequency in a case where the temperature is measured within a range where the error occurs, so that the degradation of the S/N ratio can be suppressed even in the temperature range where the error occurs.

First Modification

In the fifth embodiment described above, the crystal oscillator 160 is added, and in the temperature range higher than the normal temperature or in the temperature range lower than the normal temperature, the clock signal $CLK_{OSC}$ from the crystal oscillator 160 is selected to suppress the degradation of the S/N ratio. However, due to the addition of the crystal oscillator 160, power consumption is greater than before addition. A communication apparatus 100 of a first modification of the fifth embodiment is different from the fifth embodiment in that power consumption is reduced while the degradation of the S/N ratio is suppressed in the temperature range higher than the normal temperature or the temperature range lower than the normal temperature.

Figure 32:
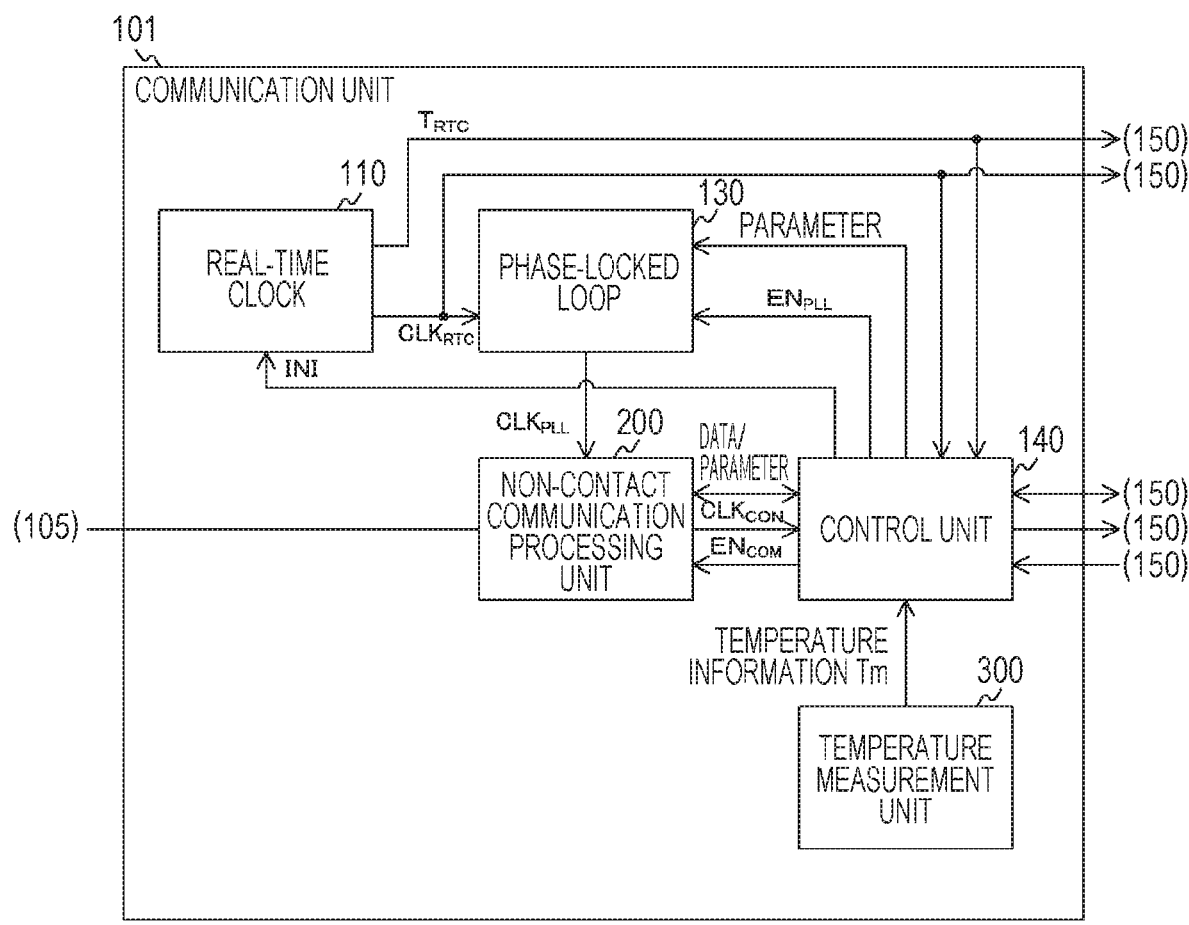
FIG. 32 is a block diagram illustrating a configuration example of a communication unit in a first modification of the fifth embodiment of the present technology.

FIG. 32 is a block diagram illustrating a configuration example of a communication unit 101 in the first modification of the fifth embodiment. The communication unit 101 of the first modification is different from the fifth embodiment in that the crystal oscillator 160 is not included.

A control unit 140 of the first modification controls the frequency division ratio DIV to an initial value in a case where a temperature within a temperature range including the normal temperature is measured. Here, the initial value of the frequency division ratio DIV is set to a value slightly greater than $fc/f_{RTC}$, for example. In addition, in a case where a temperature outside the temperature range including the normal temperature is measured, the control unit 140 controls the frequency division ratio DIV to a value higher than the initial value.

As described above, at a temperature deviating from the normal temperature, the frequency of the clock signal $CLK_{RTC}$ decreases and an error occurs; however, by an amount for that, the frequency division ratio is increased, whereby the degradation of the S/N ratio due to the error can be suppressed. In addition, since the crystal oscillator 160 is not included, power consumption can be reduced by an amount for the crystal oscillator 160.

Incidentally, the control unit 140 controls the frequency division ratio to one of two frequency division ratios (multiplication ratios) depending on whether or not the temperature is within the temperature range including the normal temperature; however, the temperature range is more finely divided, and the control unit 140 may control the frequency division ratio to one of three or more multiplication ratios. For example, the control unit 140 divides the temperature range into five, and sets the multiplication ratio to the initial value in the central temperature range including the normal temperature. Then, in a case where the temperature is within the range adjacent to the central temperature range, the multiplication ratio is set to a value higher than the initial value, and in a case where the temperature is neither within the central range nor in the adjacent range, the frequency division ratio is set to a further higher value. In this way, as the temperature is farther from the normal temperature, the multiplication ratio is controlled to a higher multiplication ratio.

As described above, according to the first modification of the fifth embodiment of the present technology, the communication apparatus 100 controls the frequency division ratio in accordance with the temperature, so that the degradation of the S/N ratio can be suppressed even in the temperature range where the error occurs. In addition, since the crystal oscillator 160 is unnecessary, an increase in power consumption can be suppressed.

Second Modification

In the fifth embodiment described above, the communication apparatus 100 measures the temperature by the thermistor circuit 310; however, it is also possible to measure the temperature with a circuit and an element other than the thermistor circuit 310. For example, the temperature may be measured by a proportional to absolute temperature voltage (Proportional To Absolute Temperature (PTAT)) circuit. The communication apparatus 100 of a second modification of the fifth embodiment is different from the fifth embodiment in that the temperature is measured by the proportional to absolute temperature voltage circuit.

Figure 33:
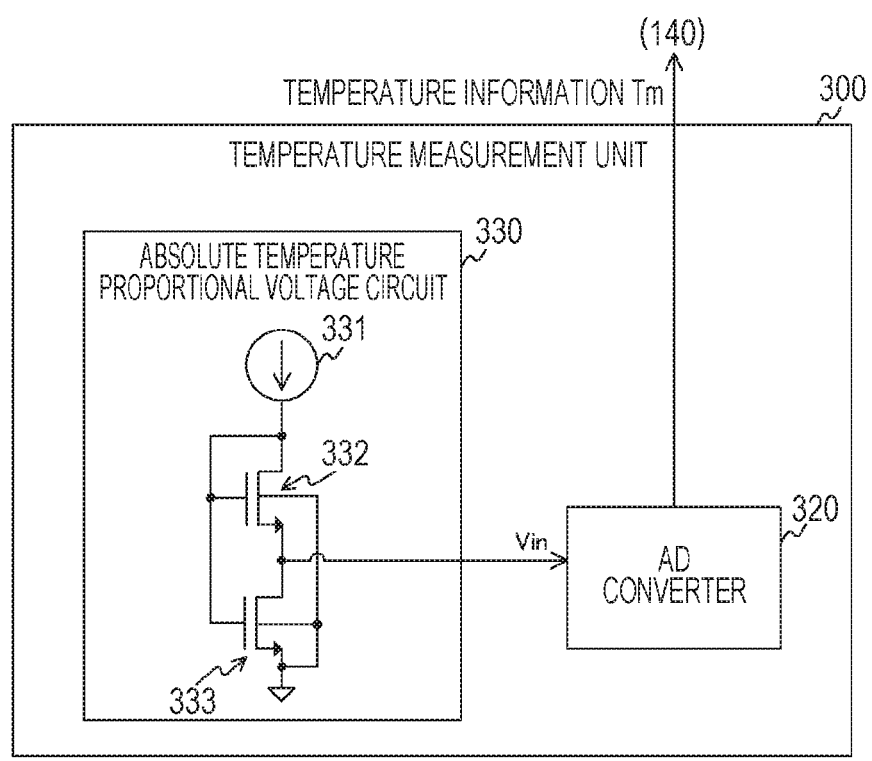
FIG. 33 is a block diagram illustrating a configuration example of a temperature measurement unit in a second modification of the fifth embodiment of the present technology.

FIG. 33 is a block diagram illustrating a configuration example of a temperature measurement unit 300 in the second modification of the fifth embodiment. The temperature measurement unit 300 of the second modification is different from the fifth embodiment in that a proportional to absolute temperature voltage circuit 330 is included instead of the thermistor circuit 310. The proportional to absolute temperature voltage circuit 330 includes a current source 331 and transistors 332 and 333. As the transistors 332 and 333, N-type MOS transistors are used, for example.

The transistors 332 and 333 are connected in series between the current source 331 and the ground terminal, and a connection point between the transistors is connected to the AD converter 320. The voltage at the connection point is a value proportional to the absolute temperature. In addition, the gates of the transistors 332 and 333 are commonly connected to the current source 331. In addition, the back gates of the transistors 332 and 333 are connected to the ground terminal.

The measurement range of the proportional to absolute temperature voltage circuit 330 is wider than that of the thermistor circuit 310, and variation in the temperature characteristic is small, so that it is possible to accurately measure the temperature in a wide temperature range. In addition, the proportional to absolute temperature voltage circuit is often used to compensate for the temperature characteristic of an analog circuit such as a filter. For this reason, the proportional to absolute temperature voltage circuit may be shared by the filter and the AD converter 320.

As described above, according to the second modification of the fifth embodiment of the present technology, the communication apparatus 100 measures the temperature by the proportional to absolute temperature voltage circuit 330, so that the temperature can be measured accurately in a wider temperature range than the thermistor circuit.

Third Modification

In the fifth embodiment described above, the AD converter 320 generates temperature information of plural bits indicating the temperature; however, the AD converter 320 may generate a 1-bit temperature information indicating whether or not the temperature is within the temperature range including the normal temperature. An AD converter in this modification of the fifth embodiment is different from the fifth embodiment in that the 1-bit temperature information is generated.

Figure 34:
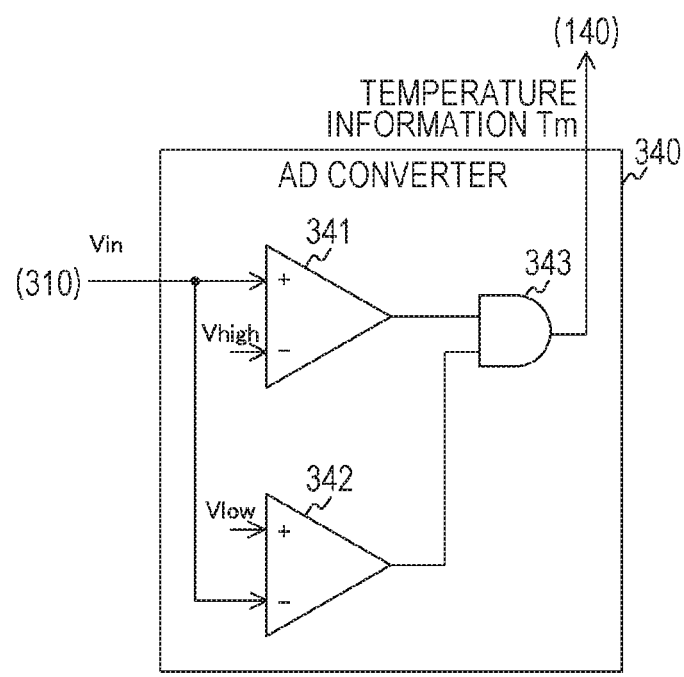
FIG. 34 is a block diagram illustrating a configuration example of an analog to digital (AD) converter in a third modification of the fifth embodiment of the present technology.

FIG. 34 is a block diagram illustrating a configuration example of an AD converter 340 in a third modification of the fifth embodiment. In the temperature measurement unit 300 of the third modification, the AD converter 340 is provided instead of the AD converter 320. The AD converter 340 includes comparators 341 and 342, and an AND (logical product) gate 343.

The comparator 341 compares the input voltage Vin from the thermistor circuit 310 with a reference voltage Vhigh that is a voltage of the thermistor circuit 310 of when the temperature is the upper limit value. The input voltage Vin is input to the non-inverting input terminal (+) of the comparator 341, and the reference voltage Vhigh is input to the inverting input terminal (−). The comparator 341 outputs a comparison result to the AND gate 343.

The comparator 342 compares the input voltage Vin from the thermistor circuit 310 with a reference voltage Vlow that is a voltage of the thermistor circuit 310 of when the temperature is the lower limit value. The input voltage Vin is input to the inverting input terminal (−) of the comparator 342, and the reference voltage Vlow is input to the inverting input terminal (+). The comparator 342 outputs a comparison result to the AND gate 343.

The AND gate 343 outputs a logical product of the comparison results of the comparators 341 and 342 as the temperature information Tm. As a result, in a case where the temperature is within the temperature range, the high-level temperature information Tm is generated, and otherwise, the low-level temperature information Tm is generated. In this way, in a case where the temperature information Tm is 1-bit, the AD converter 340 can be implemented with a simple configuration of two comparators (341 and 342) and one logic gate (343).

As described above, according to the third modification of the fifth embodiment of the present technology, the temperature information Tm is 1-bit, so that the AD converter 340 can be implemented with the simple configuration.

Incidentally, the embodiment described above describes an example for embodying the present technology, and matters in the embodiment and matters specifying the invention in the claims have correspondence relationships. Similarly, the matters specifying the invention in the claims and the matters in the embodiment of the present technology denoted by the same names have correspondence relationships. However, the present technology is not limited to the embodiment, and can be embodied by subjecting the embodiment to various modifications without departing from the gist thereof.

In addition, the processing procedure described in the above embodiment may be regarded as a method having these series of procedures, and may be regarded as a program for causing a computer to execute these series of procedures or as a recording medium for storing the program. As the recording medium, for example, a Compact Disc (CD), MiniDisc (MD), Digital Versatile Disc (DVD), memory card, Blu-ray (registered trademark) Disc, or the like can be used.

Incidentally, the effect described here is not necessarily limited, and can be any effect described in the present disclosure.

Incidentally, the present technology can also be configured as described below.

(1) A communication apparatus including:
a periodic signal generating unit that generates a predetermined periodic signal;
a clocking unit that clocks time in synchronization with the predetermined periodic signal;
a multiplication unit that multiplies the predetermined periodic signal to supply the signal as a multiplied signal; and
a communication processing unit that performs predetermined communication processing in synchronization with the multiplied signal.

(2) The communication apparatus according to (1), further including:
a high frequency signal generating unit that generates a high frequency signal having a higher frequency than the predetermined periodic signal; and
a selection unit that selects either the high frequency signal or the predetermined periodic signal to supply a selected signal to the multiplication unit.

(3) The communication apparatus according to (2), in which
the predetermined communication processing includes processing of transmitting and receiving a signal superimposed on a carrier,
a setting unit is further included, the setting unit setting any of a plurality of frequencies as a frequency of the carrier in the communication processing unit, and
the selection unit selects the predetermined periodic signal in a case where the frequency of the carrier does not exceed a predetermined frequency, and selects the high frequency signal in a case where the frequency of the carrier is higher than the predetermined frequency.

(4) The communication apparatus according to (2), in which
the predetermined communication processing includes processing of transmitting and receiving a baseband signal,
a setting unit is further included, the setting unit setting any of a plurality of frequencies as a frequency of the baseband signal in the communication processing unit, and
the selection unit selects the predetermined periodic signal in a case where the frequency of the baseband signal does not exceed a predetermined frequency, and selects the high frequency signal in a case where the frequency of the baseband signal is higher than the predetermined frequency.

(5) The communication apparatus according to (2), further including
a temperature measurement unit that measures temperature, in which
the selection unit selects the predetermined periodic signal in a case where the temperature measured is a temperature within a predetermined range, and selects the high frequency signal in a case where the temperature measured is a temperature outside the predetermined range.

(6) The communication apparatus according to (5), in which
the temperature measurement unit includes:
a thermistor whose resistance varies with a change of the temperature, and
a measurement unit that measures the temperature on the basis of a voltage corresponding to the resistance.

(7) The communication apparatus according to (6), in which
the temperature measurement unit includes:
a proportional to absolute temperature voltage circuit that generates a voltage proportional to the temperature; and
a measurement unit that measures the temperature on the basis of the voltage.

(8) The communication apparatus according to any of (1) to (7), in which the predetermined communication processing includes processing of transmitting and receiving a signal superimposed on a carrier, and a frequency of the carrier does not exceed 13.56 megahertz.

(9) The communication apparatus according to any of (1) to (7), in which the predetermined communication processing includes processing of transmitting and receiving a baseband signal, and a frequency of the baseband signal does not exceed 13.56 megahertz.

(10) The communication apparatus according to any of (1) to (9), in which the predetermined communication processing includes processing of transmitting and receiving a packet having a packet length not exceeding 4.867 microseconds.

(11) The communication apparatus according to any of (1) to (10), in which the predetermined communication processing includes processing of transmitting and receiving data at a data rate not exceeding 424 kilobits per second.

(12) The communication apparatus according to any of (1) to (11), in which the predetermined communication processing includes processing of modulating or demodulating a symbol having a symbol length not shorter than 2.36 microseconds.

(13) The communication apparatus according to any of (1) to (12), in which the predetermined communication processing includes processing of transmitting and receiving a signal superimposed on a carrier, and the multiplication unit multiplies the periodic signal by a multiplication ratio higher than a value obtained by dividing a frequency of the carrier by a frequency of the predetermined periodic signal.

(14) The communication apparatus according to any of (1) to (13), in which the predetermined communication processing includes processing of transmitting and receiving a baseband signal, and the multiplication unit multiplies the periodic signal by a multiplication ratio higher than a value obtained by dividing a frequency of the baseband signal by a frequency of the predetermined periodic signal.

(12) The communication apparatus according to any of (1) to (11), in which the communication processing unit performs the communication processing in accordance with a communication standard in non-contact communication.

(13) The communication apparatus according to any of (1) to (12), in which the communication processing unit performs the communication processing in accordance with a communication standard in human body communication.

(14) A method for controlling a communication apparatus, the method including:

a periodic signal generating procedure of generating a predetermined periodic signal;

a clocking procedure of clocking time in synchronization with the predetermined periodic signal;

a multiplication procedure of multiplying the predetermined periodic signal to supply the signal as a multiplied signal; and a communication processing procedure of performing predetermined communication processing in synchronization with the multiplied signal.

REFERENCE SIGNS LIST

100 Communication apparatus
101 Communication unit
105 Antenna
106, 107 Electrode
110, 151, 510 Real-time clock
111, 182 Battery
112 Power management unit
113 Clocking unit
120, 152, 160 Crystal oscillator
121, 122, 161, 162, 311 Resistor
123, 163 Inverter
124, 164 Crystal resonator
125, 126, 165, 166 Capacitor
130 Phase-locked loop
131 Phase comparator
132 Low pass filter
133 Voltage controlled oscillator
134 Frequency divider
140 Control unit
150, 520 Host unit
153 Processing circuit
170 Switch
181 Oscillation circuit
200 Non-contact communication processing unit
201 Human body communication processing unit
210, 211 Frequency divider
212, 219 Low noise amplifier
213, 220 Mixer
214 High pass filter
215, 221 Low pass filter
216, 233 Automatic gain control unit
217, 234 Buffer
218, 235, 320, 340 AD converter
222, 236 Modem unit
231 Reception amplifier
232, 241 Band pass filter
237 Transmission amplifier
300 Temperature measurement unit
310 Thermistor circuit
312 Thermistor
330 Proportional to absolute temperature voltage circuit
331 Current source
332, 333 Transistor
341, 342 Comparator
343 AND (logical product) gate
500 Information processing apparatus

The invention claimed is:

1. A communication apparatus, comprising:
a first oscillator configured to generate a first periodic clock signal;
a second oscillator configured to generate a high frequency signal, wherein a frequency of the high frequency signal is higher than a frequency of the first periodic clock signal; and
circuitry configured to:
clock a current time in synchronization with the first periodic clock signal;
set a frequency of a carrier;
enable one of the first oscillator or the second oscillator based on the frequency of the carrier, wherein the first oscillator is enabled in case the frequency of the carrier is less than a specific frequency, and the second oscillator is enabled in case the frequency of the carrier is higher than the specific frequency;

calculate a value based on division of the frequency of the carrier by a frequency associated with the enabled one of the first oscillator or the second oscillator;

set a multiplication ratio based on the calculated value;

multiply the frequency associated with the enabled one of the first oscillator or the second oscillator by the set multiplication ratio;

generate a second periodic clock signal based on the multiplication of the frequency associated with the enabled one of the first oscillator or the second oscillator by the set multiplication ratio; and execute a communication process in synchronization with the second periodic clock signal, wherein the communication process includes transmission and reception of a signal superimposed on the carrier.

2. The communication apparatus according to claim 1, wherein
the communication process further includes transmission and reception of a baseband signal, and
the circuitry is further configured to:
set a frequency of a plurality of frequencies as a frequency of the baseband signal;
select the first periodic clock signal based on the frequency of the baseband signal that is less than the specific frequency; and
select the high frequency signal based on the frequency of the baseband signal that is higher than the specific frequency.

3. The communication apparatus according to claim 1, wherein the circuitry is further configured to:
measure a temperature inside the communication apparatus;
select the first periodic clock signal based on the measured temperature that is within a temperature range; and
select the high frequency signal based on the measured temperature that is outside the temperature range.

4. The communication apparatus according to claim 3, wherein
the circuitry includes a thermistor having a resistance,
the resistance of the thermistor is variable based on a change of the temperature, and
the circuitry is further configured to measure the temperature based on a voltage corresponding to the resistance.

5. The communication apparatus according to claim 3, wherein the circuitry is further configured to:
generate a voltage proportional to the temperature; and
measure the temperature based on the generated voltage.

6. The communication apparatus according to claim 1, wherein the frequency of the carrier is one of less than or equal to 13.56 megahertz.

7. The communication apparatus according to claim 1, wherein
the communication process further includes transmission and reception of a baseband signal, and
a frequency of the baseband signal is one of less than or equal to 13.56 megahertz.

8. The communication apparatus according to claim 1, wherein the communication process further includes transmission and reception of a packet having a packet length one of less than or equal to 4.867 microseconds.

9. The communication apparatus according to claim 1, wherein the communication process further includes transmission and reception of data at a data rate one of less than or equal to 424 kilobits per second.

10. The communication apparatus according to claim 1, wherein the communication process further includes one of modulation or demodulation of a symbol having a symbol length one of more than or equal to 2.36 microseconds.

11. The communication apparatus according to claim 1, wherein the circuitry is further configured to execute the communication process based on a communication standard in a non-contact communication.

12. The communication apparatus according to claim 1, wherein the circuitry is further configured to execute the communication process based on a communication standard in a human body communication.

13. A method for controlling a communication apparatus, the method comprising:
generating, by a first oscillator, a first periodic clock signal;
clocking, by circuitry, a current time in synchronization with the first periodic clock signal;
generating, by a second oscillator, a high frequency signal, wherein a frequency of the high frequency signal is higher than a frequency of the first periodic clock signal;
setting, by the circuitry, a frequency of a carrier;
enabling, by the circuitry, one of the first oscillator or the second oscillator based on the frequency of the carrier, wherein
the first oscillator is enabled in case the frequency of the carrier is less than a specific frequency, and
the second oscillator is enabled in case the frequency of the carrier is higher than the specific frequency;
calculating, by the circuitry, a value based on division of the frequency of the carrier by a frequency associated with the enabled one of the first oscillator or the second oscillator;
setting, by the circuitry, a multiplication ratio based on the calculated value;
multiplying, by the circuitry, the frequency associated with the enabled one of the first oscillator or the second oscillator by the set multiplication ratio;
generating, by the circuitry, a second periodic clock signal based on the multiplication of the frequency associated with the enabled one of the first oscillator or the second oscillator by the set multiplication ratio; and
executing, by the circuitry, a communication process in synchronization with the second periodic clock signal, wherein the communication process includes transmission and reception of a signal superimposed on the carrier.

* * * * *